US011927058B2

(12) United States Patent
Lee et al.

(10) Patent No.: US 11,927,058 B2
(45) Date of Patent: Mar. 12, 2024

(54) BLIND LIFTING DEVICE AND A BLIND LIFTING CONTROL MODULE THEREOF

(71) Applicant: SYNCPROTO CO., LTD., New Taipei (TW)

(72) Inventors: Cheng-Hung Lee, New Taipei (TW); Lung-Yi Chiang, New Taipei (TW)

(73) Assignee: SYNCPROTO CO., LTD., New Taipei (TW)

( * ) Notice: Subject to any disclaimer, the term of this patent is extended or adjusted under 35 U.S.C. 154(b) by 319 days.

(21) Appl. No.: 17/505,417

(22) Filed: Oct. 19, 2021

(65) Prior Publication Data

US 2022/0235608 A1 Jul. 28, 2022

(30) Foreign Application Priority Data

Jan. 28, 2021 (TW) ................................ 110103296

(51) Int. Cl.

*E06B 9/78* (2006.01)
*E06B 9/44* (2006.01)
*E06B 9/68* (2006.01)

(52) U.S. Cl.

CPC .................. *E06B 9/68* (2013.01); *E06B 9/44* (2013.01); *E06B 9/78* (2013.01); *E06B 2009/785* (2013.01)

(58) Field of Classification Search

CPC ..... E06B 9/68; E06B 9/78; E06B 9/60; E06B 9/56; E06B 9/45; E06B 9/42; E06B 2009/785; E06B 9/80; E06B 9/82; E06B 9/84; E06B 9/88; E06B 9/90; E06B 9/32;

(Continued)

(56) References Cited

U.S. PATENT DOCUMENTS 187,868 A * 2/1877 Knapp ...................... E06B 9/78
160/300
219,185 A * 9/1879 Temple ..................... E06B 9/78
160/300

(Continued)

FOREIGN PATENT DOCUMENTS

JP 2009-121232 A 6/2009
JP 2013-536340 A 9/2013

OTHER PUBLICATIONS

Office Action, which was issued to Japanese counterpart application No. 2022-003899 by the JPO dated Jan. 10, 2023, and machine translation (4 pages).

(Continued)

*Primary Examiner* — Johnnie A. Shablack
(74) *Attorney, Agent, or Firm* — Hamre, Schumann, Mueller & Larson, P.C.

(57) ABSTRACT

A blind lifting control module includes a transmitting wheel, an anti-backward unit and a driving unit disposed to a supporting unit. The transmitting wheel for connecting a blind reeled horizontal axle has ratchet portions respectively meshable with corresponding ratchet portions of an anti-backward wheel and a driving reel. A pull cord is reeled on the driving reel and has a free end passing through a thrust member and a hindering member, and is pulled to release the anti-backward wheel to permit lowering of a blind. The thrust member is turned by pulling of the pull cord to thrust the driving reel to mesh with the transmitting wheel for lifting the blind.

19 Claims, 41 Drawing Sheets

(58) Field of Classification Search
CPC ............... E06B 9/322; E06B 2009/801; E06B 2009/802; E06B 2009/905
See application file for complete search history.

(56) References Cited

U.S. PATENT DOCUMENTS 1,378,347 A * 5/1921 Hart .......................... E06B 9/90 160/306
1,568,203 A * 1/1926 Bernard .................... E06B 9/78 160/300
2,025,656 A * 12/1935 Fehan ....................... E06B 9/90 160/292
4,476,910 A * 10/1984 Saito ......................... E06B 9/90 160/291
4,534,396 A 8/1985 Jung
5,029,629 A 7/1991 Cheng-Pei
5,791,393 A * 8/1998 Judkins ................... E06B 9/326 160/84.05
5,890,529 A * 4/1999 Haarer ...................... E06B 9/78 192/48.92
6,142,211 A * 11/2000 Judkins ..................... E06B 9/90 160/319
7,128,126 B2 * 10/2006 Smith ..................... E06B 9/262 160/84.05
7,578,334 B2 * 8/2009 Smith ....................... E06B 9/42 160/84.05
7,665,507 B2 * 2/2010 Naoki ....................... E06B 9/78 160/170
8,136,569 B2 * 3/2012 Bohlen ..................... E06B 9/42 192/223.4
8,186,413 B2 * 5/2012 Fujita ........................ E06B 9/34 160/319
8,191,605 B2 * 6/2012 Kwak ....................... E06B 9/42 160/319
8,356,653 B2 * 1/2013 Fu-Lai .................... E06B 9/322 160/84.05
8,844,605 B2 * 9/2014 Ng ............................ E06B 9/78 192/81 C
8,851,143 B2 * 10/2014 Zhu ........................... E06B 9/38 160/121.1
10,107,032 B2 * 10/2018 Chen ....................... F16H 19/06
10,138,676 B2 * 11/2018 Bohlen ..................... E06B 9/56
10,407,983 B2 9/2019 Holt et al.
11,448,009 B2 * 9/2022 Otsuka .................... E06B 9/262
11,492,845 B2 * 11/2022 Cheng ..................... E06B 9/262
11,505,993 B2 * 11/2022 de Vries .................... E06B 9/78
2014/0130989 A1 * 5/2014 Chan ......................... E06B 9/90 242/389
2014/0216668 A1 8/2014 Kim
2016/0281423 A1 * 9/2016 Kao .......................... E06B 9/42
2018/0363370 A1 * 12/2018 Cheng ....................... E06B 9/42
2019/0343318 A1 * 11/2019 Cheng ....................... E06B 9/78

OTHER PUBLICATIONS

Search report, which was issued to European Counterpart Application No. 21207515.4 by the EPO dated May 9, 2022 (5 pages).

* cited by examiner

BLIND LIFTING DEVICE AND A BLIND LIFTING CONTROL MODULE THEREOF

CROSS-REFERENCE TO RELATED APPLICATION

This application claims priority of Taiwanese Patent Application No. 110103296, filed on Jan. 28, 2021.

FIELD

The disclosure relates to a blind, and more particularly to a blind lifting device for controlling lifting of a blind, and a blind lifting control module thereof.

BACKGROUND

A variety of blinds including roller blinds, Roman blinds, honeycomb shades, Venetian blinds, pleated blinds, etc. are commercially available for use on a window. A conventional roller blind generally uses a loop cord-driven controller for controlling lifting of a blind body. The pull cords of some controllers are suspended outside, which may easily be entangled with objects nearby and cause inconvenience in use. In addition, young children may reach and be entangled by the pull cords, hence causing danger.

SUMMARY

Therefore, an object of the disclosure is to provide a blind lifting device and a blind lifting control module thereof that can alleviate at least one of the drawbacks of the prior art.

According to the disclosure, the blind lifting control module is connectable with an end of a horizontal axle for controlling rotation of the axle, and includes a supporting unit, a transmitting wheel, an anti-backward unit and a driving unit. The supporting unit includes a base seat and a mounting shaft which is securely connected with the base seat and which extends parallel to the horizontal axle from the base seat. The mounting shaft has a shaft portion. The transmitting wheel is rotatably sleeved on the mounting shaft, and includes an axle connecting body which is securely connectable with the end of the horizontal axle, and a flange disc which is connected with a side of the axle connecting body proximate to the base seat and which extends radially and outwardly from the axle connecting body. The axle connecting body has a receiving groove which extends from the side for receiving the shaft portion, and a first ratchet portion which is formed in the receiving groove and faces the base seat. The flange disc has a second ratchet portion which is formed on a surface that faces the base seat and surrounds the receiving groove. The anti-backward unit includes an anti-backward wheel and a biasing returning member which are received in the receiving groove. The anti-backward wheel has a movable wheel body which is movably sleeved on the shaft portion, and a third ratchet portion which is formed on a surface of the movable wheel body and faces the first ratchet portion. The anti-backward wheel is movable relative to the shaft portion between an anti-backward position, where the third ratchet portion meshes with the first ratchet portion to permit a uni-directional rotation of the transmitting wheel, and a released position, where the third ratchet portion is disengaged from the first ratchet portion. The biasing returning member is disposed to bias the anti-backward wheel to the anti-backward position. The driving unit includes a driving reel which is rotatably sleeved on the shaft portion, a transmitting member which is connected between the driving reel and the anti-backward wheel to transmit a rotation of the driving reel to move the anti-backward wheel to the released position, a thrust member which is movably disposed to the base seat, a hindering member which is pivotably disposed to the base seat, a pull cord which has an end secured to the driving reel and which winds on a periphery of the driving reel to have a free end for pulling operation, and a reel biasing member. The driving reel has a fourth ratchet portion which faces the second ratchet portion, and is movable relative to the shaft portion between a driving position, where the fourth ratchet portion meshes with the second ratchet portion, and a normal position, where the fourth ratchet portion is disengaged from the second ratchet portion. The thrust member is movable relative to the base seat between an initial position, where the thrust member is free from action with the driving reel, and a thrusting position, where the thrust member provides a thrust force to move the driving reel to the driving position. The hindering member is turnable relative to the base seat between a hindering position, where the hindering member is kept to position the thrust member in the initial position, and a keeping-off position, where the thrust member is allowed for movement to the thrusting position. The free end of the pull cord passes through the hindering member to receive a pulling force to turn the hindering member. The reel biasing member is disposed to bias the driving reel to rotate to reel the pull cord.

According to the disclosure, the blind lifting device includes a rail, a blind lifting control module described previously, a rotating support module and a horizontal axle. The rail extends in an axial horizontal direction and has first and second ends opposite to each other. The base seat of the supporting unit is connected with the first end of the rail to have the shaft portion extending toward the second end. The rotating support module is connected with the second end of the rail. The horizontal axle for reeling a blind thereon has two ends which are respectively connected with the blind lifting control module and the rotating support module so as to be controlled for its rotation by the blind lifting control module to lift and lower the blind.

The pull cord is reeled on the driving reel in a non-operated state, which can avoid entangling children and objects nearby. The operation of lifting the blind is convenient to conduct.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
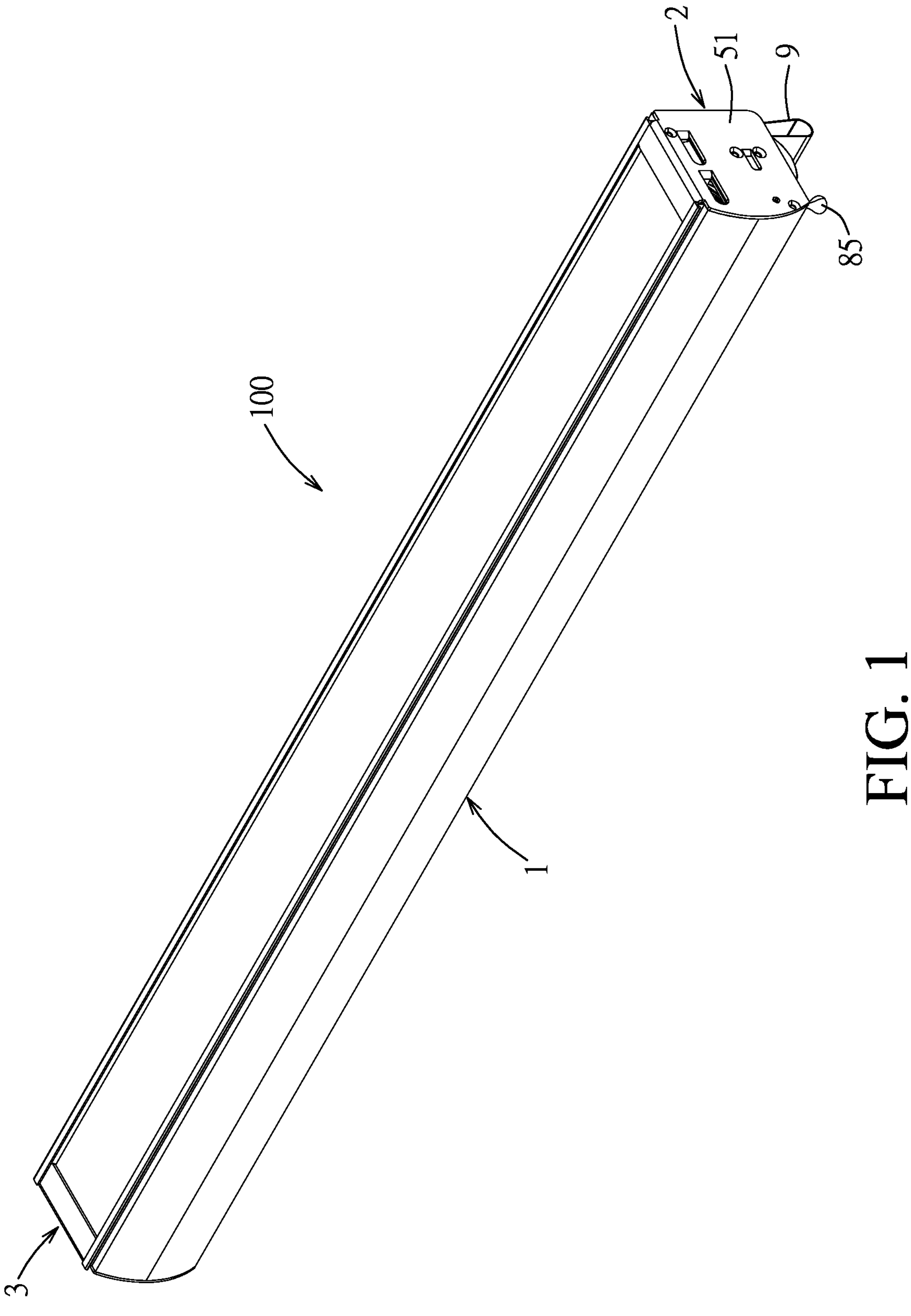
FIG. 1 is a perspective view illustrating a first embodiment of a blind lifting device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
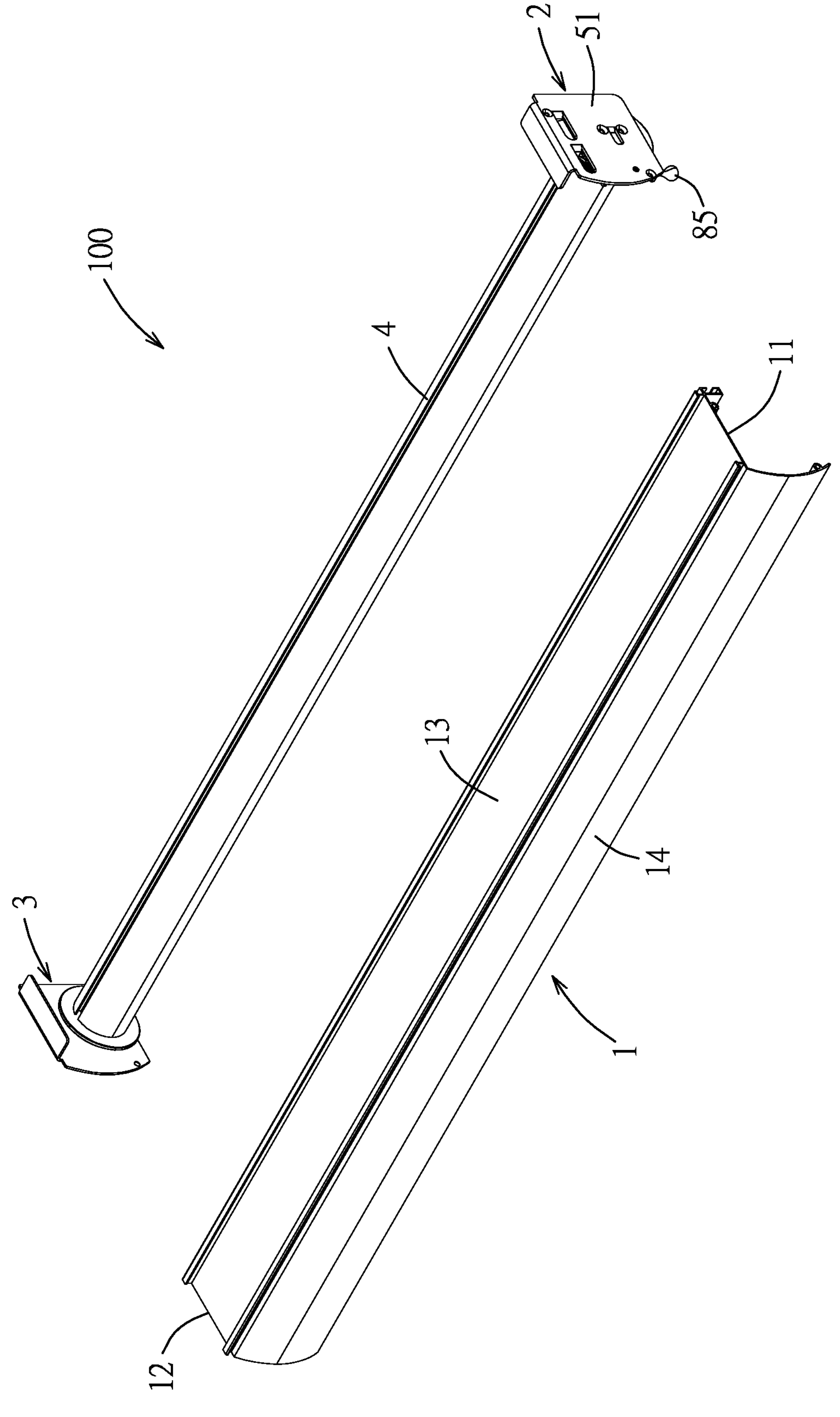
FIG. 2 is an exploded perspective view of the first embodiment.
Figure 3:
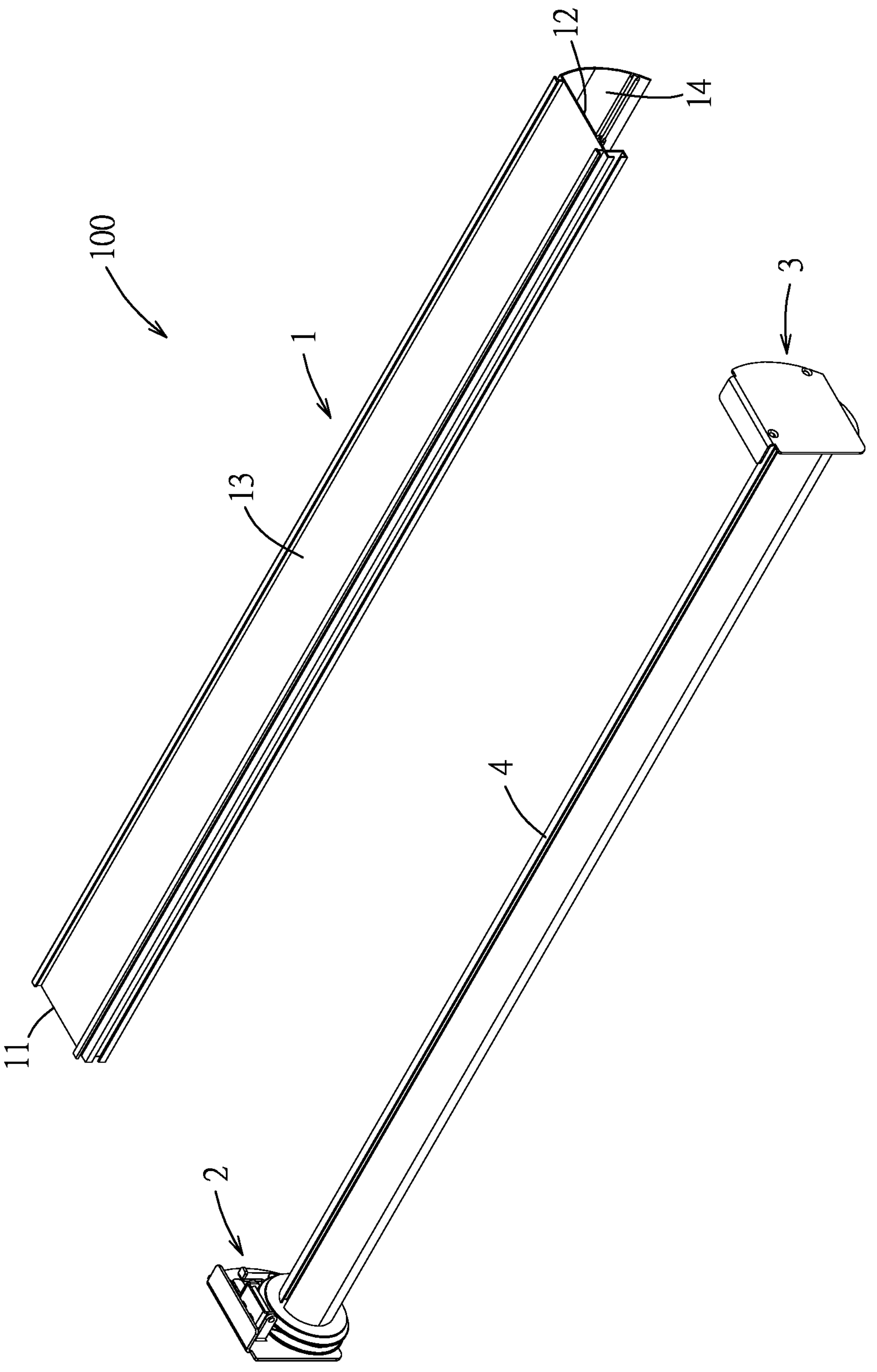
FIG. 3 is an exploded perspective view of the first embodiment taken from another angle.

Referring to FIGS. 1 to 3, a first embodiment of a blind lifting device 100 according to the disclosure includes a rail 1, a blind lifting control module 2, a rotating support module 3 and a horizontal axle 4.

The rail 1 extends in an axial horizontal direction, and has first and second ends 11, 12 opposite to each other. In one embodiment, the rail 1 includes a top wall 13 and a front wall 14 extending downwardly from a front edge of the top wall 13, and the first and second ends 11, 12 are formed at two opposite end edges of the top and front walls 13, 14. The blind lifting control module 2 is connected with the first end 11. The rotating support module 3 is connected with the second end 12. The horizontal axle 4 for reeling a blind 9 thereon has two ends which are respectively connected with the blind lifting control module 2 and the rotating support module 3 so as to be controlled for its rotation by the blind lifting control module 2 to lift and lower the blind 9. The blind 9 may be a fabric blind, Roman blind, honeycomb shade, Venetian blind, pleated blind, etc.

Figure 4:
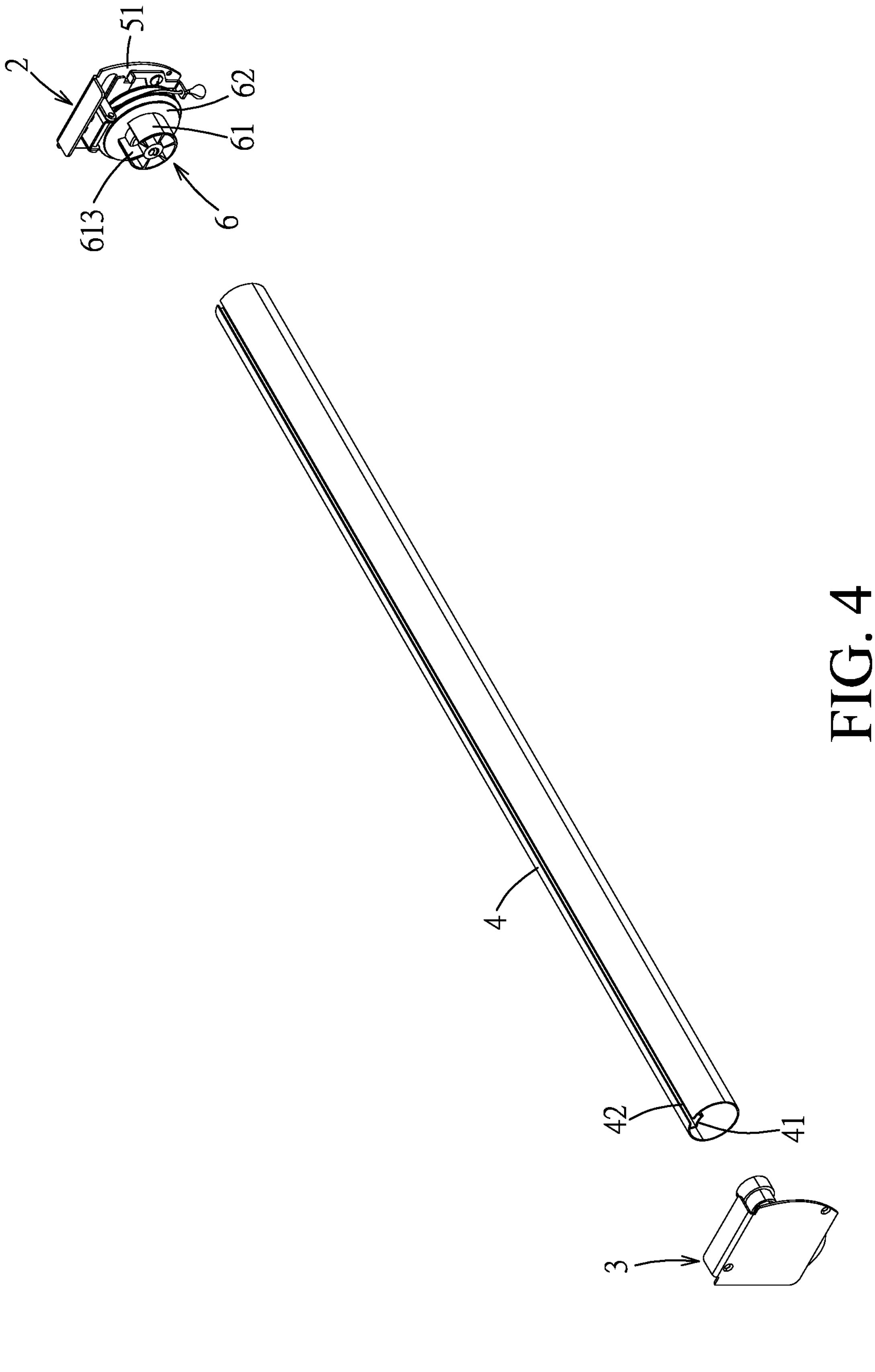
FIG. 4 is an exploded perspective view of the first embodiment, a rail thereof being removed.
Figure 5:
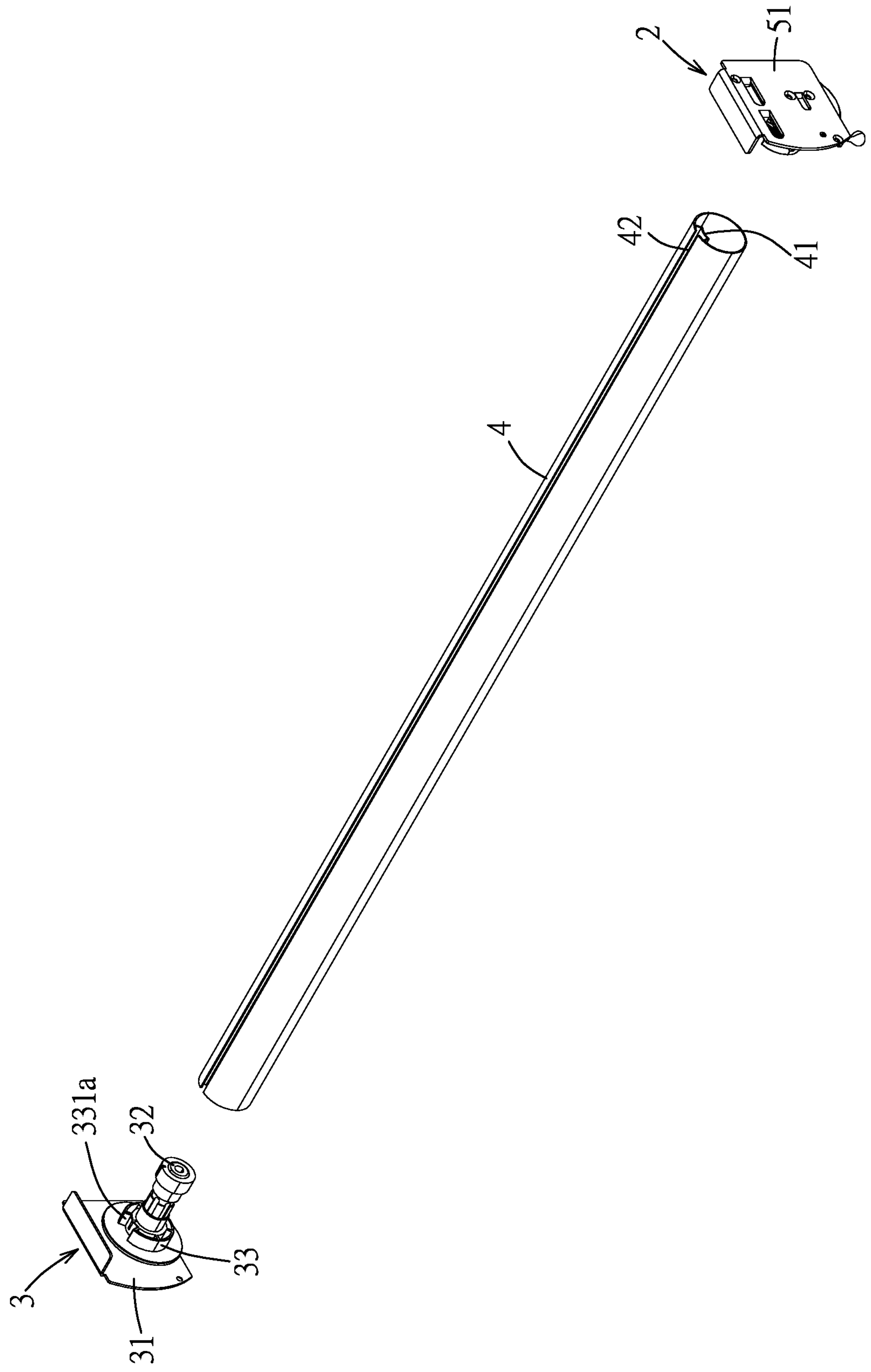
FIG. 5 is an exploded perspective view similar to FIG. 4, but taken from another angle.
Figure 6:
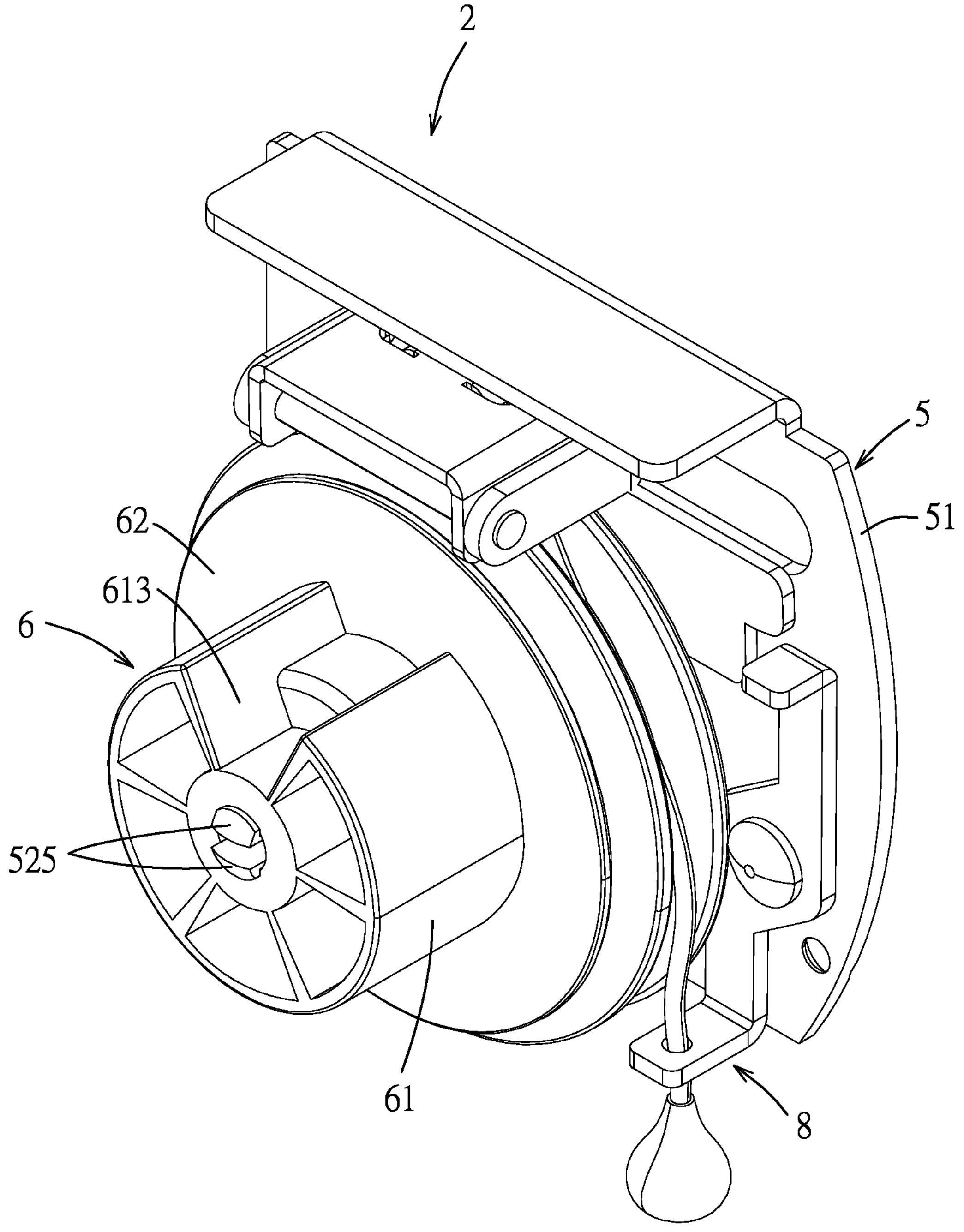
FIG. 6 is a perspective view illustrating a blind lifting control module of the first embodiment.

With reference to FIGS. 4 and 5, the horizontal axle 4 is in the form of a tubular shaft, and has a blind engaging portion 41 which is punched and concaved from an outer surrounding wall thereof and which is elongated horizontally to the two ends to define an elongated slot 42 for securely engaging with the blind 9 (see FIG. 1).

With reference to FIGS. 6 to 9, the blind lifting control module 2 includes a supporting unit 5, a transmitting wheel 6, an anti-backward unit 7 and a driving unit 8.

The supporting unit 5 includes a base seat 51 which is connected with the rail 1 (see FIG. 1), and a mounting shaft 52 which is securely connected with the base seat 51. The base seat 51 has a mounting plate 511 which extends in an upright direction transverse to the axial horizontal direction, a positioning pin portion 512 which projects horizontally from the mounting plate 511, a supporting portion 513 which projects horizontally from the mounting plate 511 and which is disposed upwardly of the positioning pin portion 512, and two first locking holes 514 formed in the mounting plate 511 and at upper and lower sides of the positioning pin portion 512. The mounting shaft 52 has a shaft portion 521 extending parallel to the horizontal axle 4, and a protrusion 522 which projects radially and outwardly from the shaft portion 521 to serve as a cam surface. In one embodiment, the shaft portion 521 includes a larger-diameter segment (521*a*) abutting against the mounting plate 511, and a smaller-diameter segment (521*b*) extending horizontally from the larger-diameter segment (521*a*). The larger-diameter segment (521*a*) has an insert hole 523 for insertion of the positioning pin portion 512, and two second locking holes 524 respectively aligned with the first locking holes 514 for screw fasteners (not shown) or hot-pressed rivets to extend through the first and second locking holes 514, 524 to secure the mounting shaft 52 to the mounting plate 511. The shaft portion 52 further includes a pair of elastic pawls 525 extending from a terminate end of the smaller-diameter segment (521*b*), and a spring positioning protrusion 526 projecting radially and outwardly from the smaller-diameter segment (521*b*) and adjacent to the larger-diameter segment (521*a*).

The transmitting wheel 6 is rotatably sleeved on the mounting shaft 52 and is retained by the elastic pawls 525 to prevent from removal, and includes an axle connecting body 61 which is securely connectable with the end of the horizontal axle 4, and a flange disc 62 which is connected with a side of the axle connecting body 61 proximate to the base seat 51 and which extends radially and outwardly from the axle connecting body 61. The axle connecting body 61 has a receiving groove 611 which extends from the side for receiving the shaft portion 521, and a first ratchet portion 612 which is formed in the receiving groove 611 and which faces the base seat 51. The flange disc 62 has a second ratchet portion 621 which is formed on a surface that faces the base seat 51 and surrounds the receiving groove 611. The axle connecting body 61 of the transmitting wheel 6 is inserted into the one end of the horizontal axle 4, and has a first retaining slot 613 which is retainingly connected with the blind engaging portion (see FIG. 4) so as to rotate with the horizontal axle 4.

With reference to FIGS. 7, 8, 10 and 11, the anti-backward unit 7 includes an anti-backward wheel 71 and a biasing returning member 72 which are received in the receiving groove 611. The anti-backward wheel 71 has a movable wheel body 711 which is movably sleeved on the shaft portion 521, and a third ratchet portion 712 which is formed on a surface of the movable wheel body 711 and faces the first ratchet portion 612. The anti-backward wheel 71 is movable axially relative to the shaft portion 521 between an anti-backward position (see FIG. 16), where the third ratchet portion 712 meshes with the first ratchet portion 612 to permit a uni-directional rotation of the transmitting wheel 6, and a released position (see FIG. 20), where the third ratchet portion 712 is disengaged from the first ratchet portion 612. The biasing returning member 72 is interposed between the anti-backward wheel 71 and the transmitting wheel 6 to bias the anti-backward wheel 71 to the anti-backward position. In one embodiment, the anti-backward wheel 71 is also rotatable relative to the shaft portion 521, and has a groove 713 which is cut in the movable wheel body 711 and engaged with the protrusion 522 so as to convert a rotation of the anti-backward wheel 71 into an axial movement between the anti-backward position and the released position. The biasing returning member 72 is in the form of an O-ring which is disposed on an outer peripheral surface of the movable wheel body 711 to provide a biasing returning force to the anti-backward wheel 71 by a friction with the inner peripheral surface of the transmitting wheel 6. In another embodiment (such as the fourth embodiment mentioned below), the biasing returning member 72 may be a coil spring sleeved around the shaft portion 521 and axially disposed between the anti-backward wheel 71 and a driving reel 81 of the driving unit 8.

With reference to FIGS. 7 to 9 again, the driving unit 8 includes a driving reel 81, a transmitting member 82, a thrust member 83, a hindering member 84, a pull cord 85, a reel biasing member 86 and an elastomeric biasing ring 87.

The driving reel 81 is rotatably sleeved on the shaft portion 521, and has a fourth ratchet portion 811 facing the second ratchet portion 621. The driving reel 81 is movable axially relative to the shaft portion 521 between a driving position (see FIG. 25), where the fourth ratchet portion 811 meshes with the second ratchet portion 621, and a normal position (see FIG. 16), where the fourth ratchet portion 811 is disengaged from the second ratchet portion 621. The transmitting member 82 is connected between the driving reel 81 and the anti-backward wheel 71 to transmit a rotation of the driving reel 81 to move the anti-backward wheel 71 to the released position. The thrust member 83 is movably disposed to the base seat 51 to be movable relative to the base seat 51 between an initial position (see FIG. 16), where the thrust member 83 is free from action with the driving reel 81, and a thrusting position (see FIG. 25), where the thrust member 83 provides a thrust force to move the driving reel 81 to the driving position. The hindering member 84 is pivotably disposed to the base seat 51 to be turnable relative to the base seat 51 between a hindering position (see FIG. 17), where the hindering member 84 is kept to position the thrust member 83 in the initial position, and a keeping-off position (see FIG. 24), where the thrust member 83 is allowed for movement to the thrusting position. The pull cord 85 has an end secured to the driving reel 81, and winds on a periphery of the driving reel 81 to have a free end passing through the hindering member 84 for pulling operation. Specifically, the free end of the pull cord 85 is disposed to receive a pulling force to turn the hindering member 84. The reel biasing member 86 is disposed to bias the driving reel 81 to rotate to reel the pull cord 85. The elastomeric biasing ring 87 is frictionally interposed between the transmitting wheel 6 and the driving reel 81 to bias the driving reel 81 back to the normal position.

In one embodiment, the driving reel 81 includes first and second reel halves 812, 813 coupled with each other. The first reel half 812 has an annular plate portion (812*a*), an annular wall portion (812*b*) extending from the annular plate portion (812*a*) toward the second reel half 813, a plurality of engaging studs (812*c*) formed on the annular wall portion (812*b*), and an annular grooved portion (812*d*) formed in the annular plate portion (812*a*) and opposite to the annular wall portion (812*b*). The fourth ratchet portion 811 is formed on the annular plate portion (812*a*) and surrounds the annular grooved portion (812*d*). The second reel half 813 has a plurality of engaging holes (813*a*) respectively engaged with the engaging studs (812*c*) to couple the first reel half 812 with the second reel half 813. The annular plate portion (812*a*), the annular wall portion (812*b*) and the second reel half 813 cooperatively define an accommodation space for receiving the reel biasing member 86. The pull cord 85 is reeled on the periphery of the annular wall portion (812*b*) and is confined between the annular plate portion (812*a*) and the second reel half 813. The annular wall portion (812*b*) has a notch 8121 for passing of the pull cord 85, and a spring positioning slot 8122 for securing of an end of the reel biasing member 86. The end of the pull cord 85 is secured to the inner side of the annular wall portion (812*b*). The reel biasing member 86 is a coil spring which is sleeved around the shaft portion 521, and has an inner end secured to the spring positioning protrusion 526, and an outer end secured to the spring positioning slot 8122 so as to provide a returning force to rotate and return the driving reel 81 and to reel the pull cord 85.

In one embodiment, the transmitting member 82 is in the form of a string having two ends which are respectively secured to the movable wheel body 711 and the driving reel 81, and a middle portion which winds on the shaft portion 521. Thus, the transmitting member 82 is tensed by a pulling force applied to the pull cord 85 to the end through the driving reel 81 to move the anti-backward wheel 71 to the released position. Specifically, the movable wheel body 711 has a string slot 714 (see FIG. 10). The annular plate portion (812*a*) is formed with a string hole 8123. The two ends of the transmitting member 82 are secured to the string slot 714 and the inner side of the annular plate portion (812*a*), and the middle portion is received in the annular grooved portion (812*d*). The transmitting member 82 surrounds the shaft portion 521 in a loosened state when it is not driven by the driving reel 81. With the pulling force applied to the pull cord 85 to the end, the transmitting member 82 is pulled through the driving reel 81 to be in a fully tensed state so as to move the anti-backward wheel 71 to the released position. When the transmitting member 82 is returned back to the loosened state, the anti-backward wheel 71 is returned back to the anti-backward position by means of the biasing returning member 72.

In one embodiment, the thrust member 83 is pivotably disposed to the supporting portion 513 of the base seat 51, and has a forced portion 831 through which the pull cord 85 passes to be turned by a pulling action of the pull cord 85, and a thrust portion 832 which is disposed at an opposite side of the driving reel 81 relative to the fourth ratchet portion 811 to thrust the driving reel 81 such that the thrust member 83 is activated by the pulling action of the pull cord 85 to turn from the initial position to the thrusting position. Specifically, the thrust member 83 has a pivot axle 836 which is pivotably journalled on the supporting portion 513 and which extends transverse to both the axial horizontal direction and the upright direction such that the forced portion 831 is turnable about the pivot axle 836.

Figure 17:
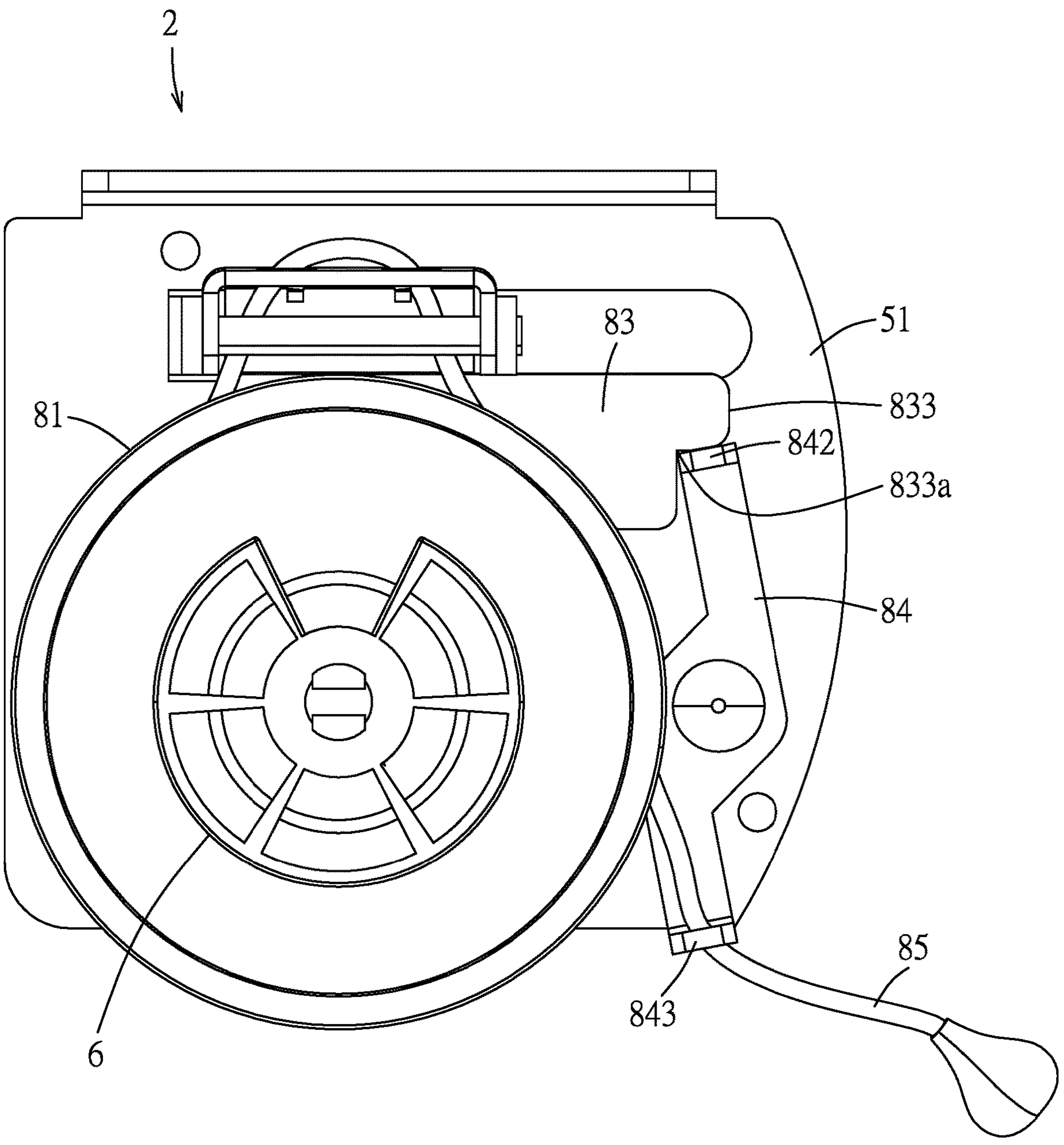
FIG. 17 is a side view illustrating the blind lifting control module in a blind-lowering operated state.

In one embodiment, the hindering member 84 is in the form of a lever which extends in the upright direction and which has a fulcrum portion 841 that is pivotably connected to the mounting plate 511 of the base seat 51, a hindering portion 842 that is disposed upwardly of the fulcrum portion 841 to engage with the thrust portion 832 of the thrust member 83 for hindering turning of the forced portion 831, and a pull portion 843 that is disposed downwardly of the fulcrum portion 841. The pull cord 85 passes through the pull portion 843. As shown in FIG. 17, when an outwardly-inclined downward pulling force is applied to the pull cord 85, the hindering portion 842 is turned to abut against the thrust member 83. Specifically, the thrust portion 832 of the thrust member 83 has an engaging notch (833*a*) cut from an end edge 833 thereof that is close to the hindering portion 842 of the hindering member 84 such that, in the hindering position, the hindering portion 842 is engaged and restricted in the engaging notch (833*a*).

With reference to FIGS. 5 and 12 to 14, the rotating support module 3 includes a mounting wall 31 which extends in the upright direction to be connected with the rail 1 (see FIG. 1), a support axle 32 which is secured to the mounting wall 31 and which extends horizontally toward the blind lifting control module 2, and a rotary seat 33 which is rotatably sleeved on the support axle 32. The rotary seat 33 has an axle connecting portion 331 which is inserted into the other end of the horizontal axle 4 and which has a second retaining slot (331*a*) that is retainingly connected with the blind engaging portion 41 so as to be rotated with the horizontal axle 4.

In one embodiment, the rotating support module 3 further includes a speed-reducing sleeve 34 and a coil member 35. The rotary seat 33 further has a tubular portion 332 which extends horizontally from the axle connecting portion 331 toward the blind lifting control module 2 to spacedly surround the support axle 32 and which has a diameter smaller than that of the axle connecting portion 331. The support axle 32 has an axle body 321 and at least one frictional ring 322 (two frictional rings 322 are shown). The axle body 321 has a secured end portion (321*a*) which is secured to the mounting wall 31, and a free end portion (321*b*) which is opposite to the secured end portion (321*a*) and exposed from the rotary seat 33. The frictional rings 322 surround the free end portion (321*b*), and are elastic O-rings to generate a frictional resistance with the speed-reducing sleeve 34.

The speed-reducing sleeve 34 has a sleeve body 341 which is sleeved on the free end portion (321*b*), and a plurality of elastic plates 342 which are arranged around the axle body 321 and which extend from the sleeve body 341 toward the rotary seat 33 and have terminate ends interposed between the tubular portion 332 and the axle body 321. The coil member 35 is sleeved around the speed-reducing sleeve 34, and has two ends which are respectively secured to the rotary seat 33 and the sleeve body 341. Specifically, a first connecting hole (331*b*) and a second connecting hole 343 are formed in the axle connecting portion 331 of the rotary seat 33 and the sleeve body 341, respectively, to securely engage with two ends of the coil member 35. The coil member 35 is a compression spring. Alternatively, the coil member 35 may be a string or wire.

As shown in FIG. 1, the horizontal axle 4 is rotated forwardly to lift the blind 9 and a clockwise rotational direction of the horizontal axle 4 is defined. The horizontal axle 4 is rotated rearwardly to lower the blind 9 and a counterclockwise rotational direction of the horizontal axle 4 is defined. During rotation of the horizontal axle 4 in the counterclockwise rotational direction, the speed-reducing sleeve 34 is in frictional contact with the frictional rings 322 to have a rotational speed slower than that of the rotary seat 33, and to shrink the coil member 35 to compress the elastic plates 342 toward the axle body 321 so as to reduce the rotational speed of the rotary seat 33 and to slowly lower the blind 9. When the horizontal axle 4 is rotated with the blind lifting control module 2 in the clockwise rotational direction to lift the blind 9, the coil member 35 is returned back to its original position and the elastic plates 342 loosely surround the axle body 321. In this state, the rotating support module 3 generates a relatively small torque to permit an operator to operate the pull cord 85 of the blind lifting control module 2 with less effort.

The operation of the blind lifting control module 2 is described in detail as follows.

With reference to FIGS. 1, 7, 15 and 16, when the blind 9 is in a non-operated state, the pull cord 85 is reeled on the driving reel 81, and the anti-backward wheel 71 is in the anti-backward position such that, with the meshing engagement of the first and third ratchet portions 612, 712, the transmitting wheel 6 is only permitted to perform a unidirectional rotation (i.e., a rotation in the clockwise rotational direction to rotate the horizontal axle 4) and the horizontal axle 4 is kept from lowering the blind 9. At this stage, the thrust member 83 is in the initial position and the driving reel 81 is in the normal position.

Figure 7:
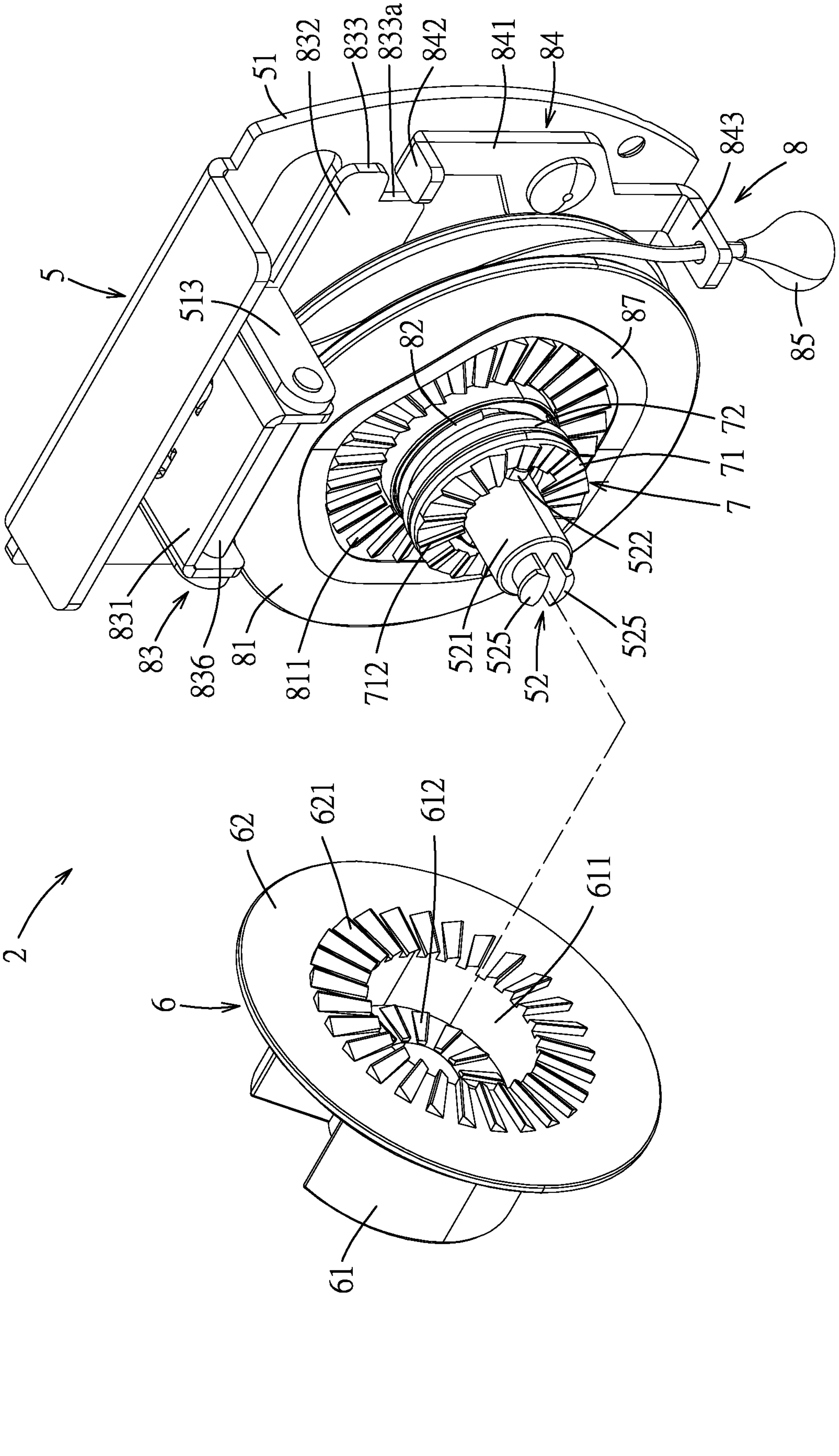
FIG. 7 is a partly-exploded perspective view of the blind lifting control module.
Figure 8:
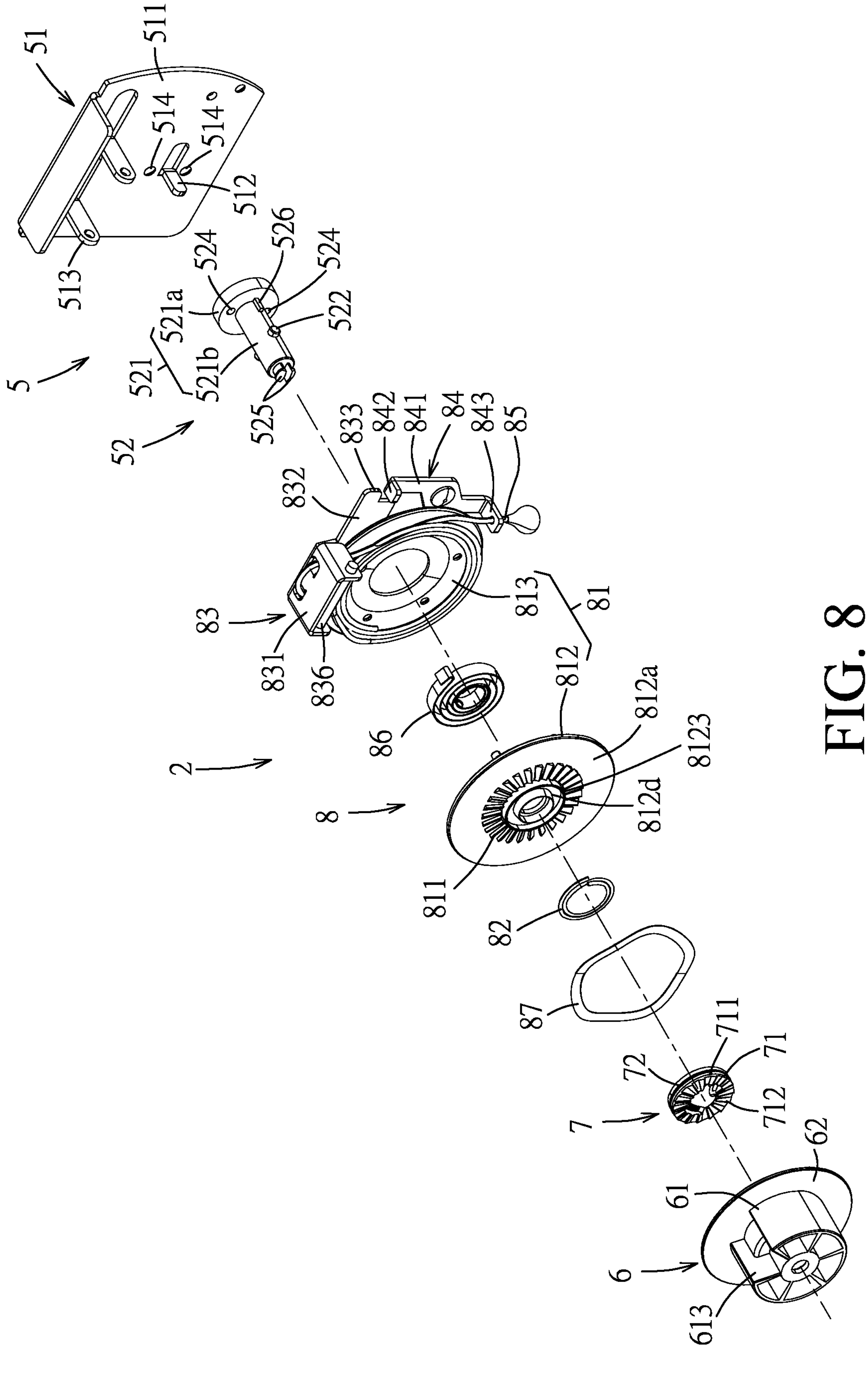
FIG. 8 is an exploded perspective view of the blind lifting control module.
Figure 9:
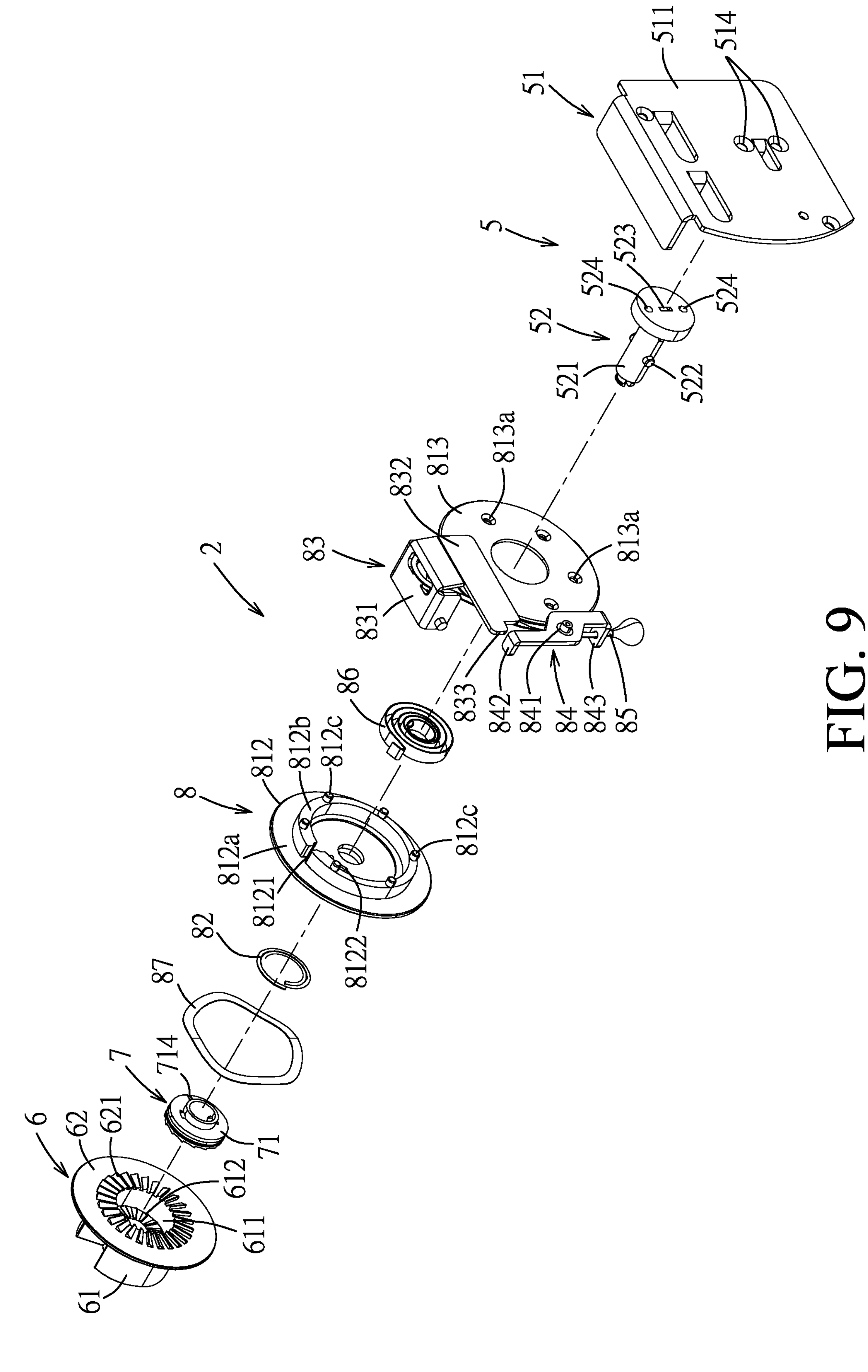
FIG. 9 is an exploded perspective view similar to FIG. 8, but taken from another angle.
Figure 10:
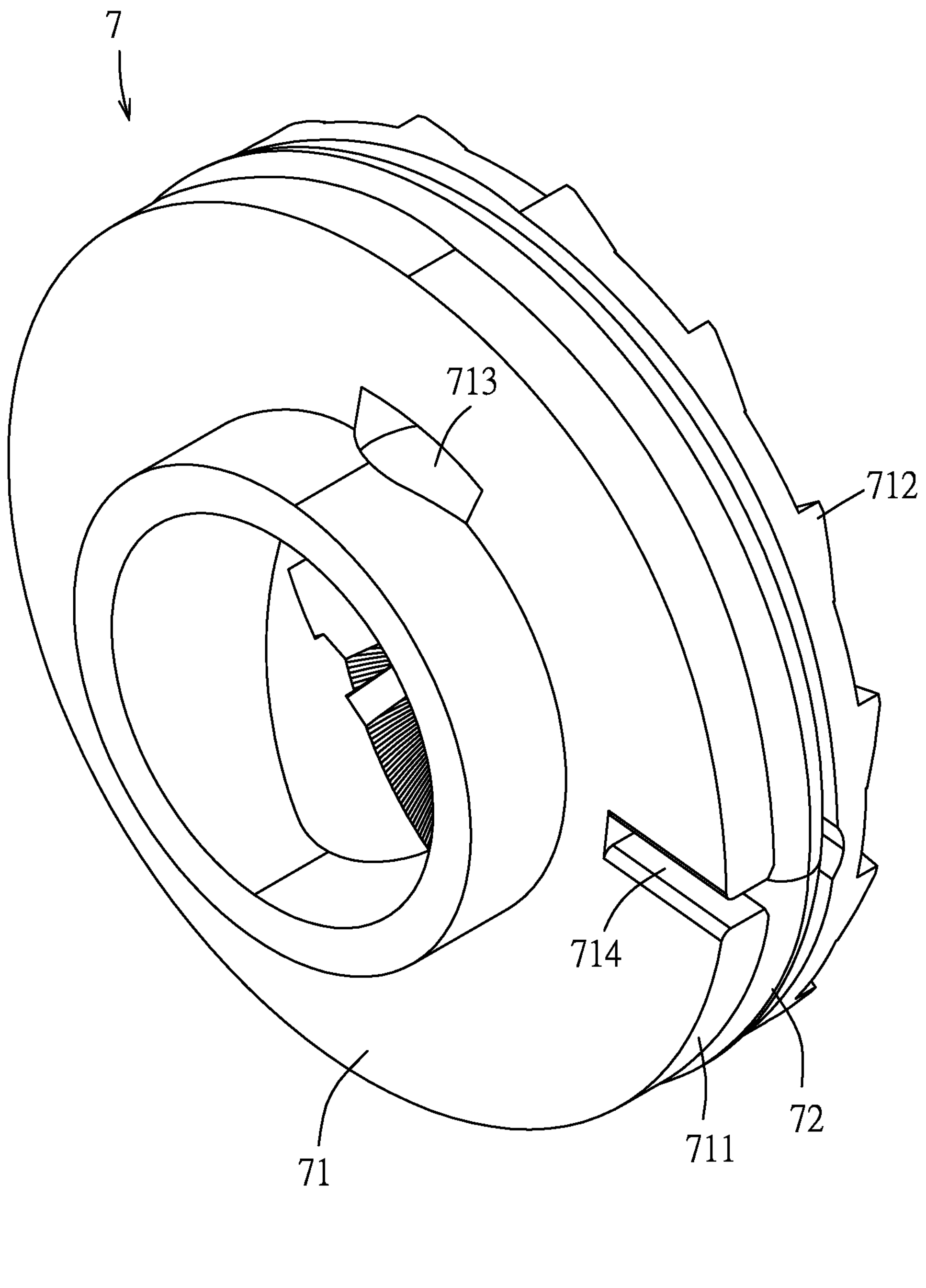
FIG. 10 is a perspective view of an anti-backward unit of the blind lifting control module.
Figure 11:
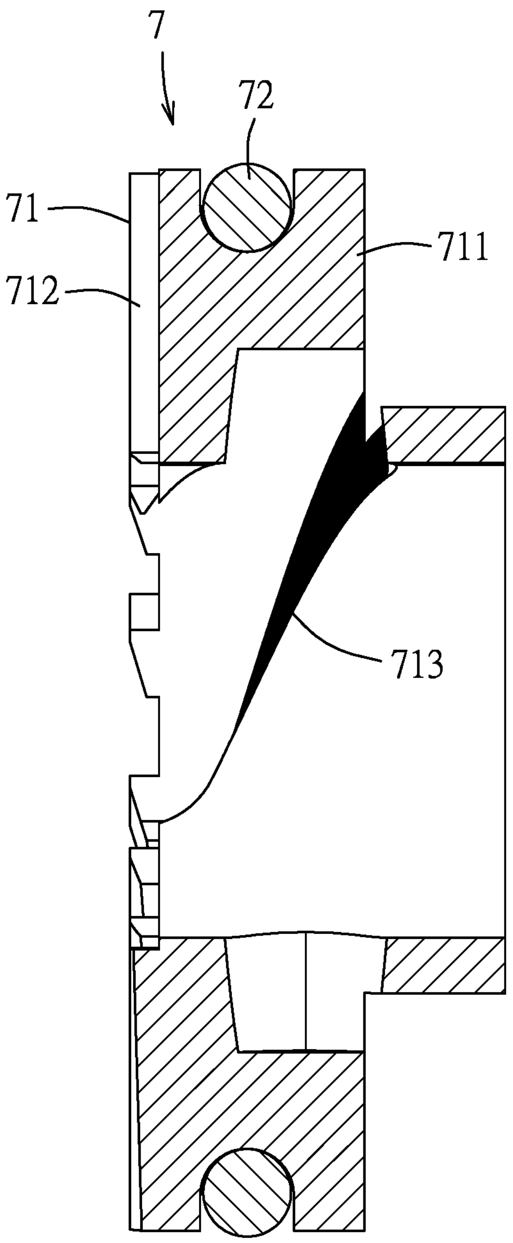
FIG. 11 is a sectional view of the anti-backward unit.
Figure 12:
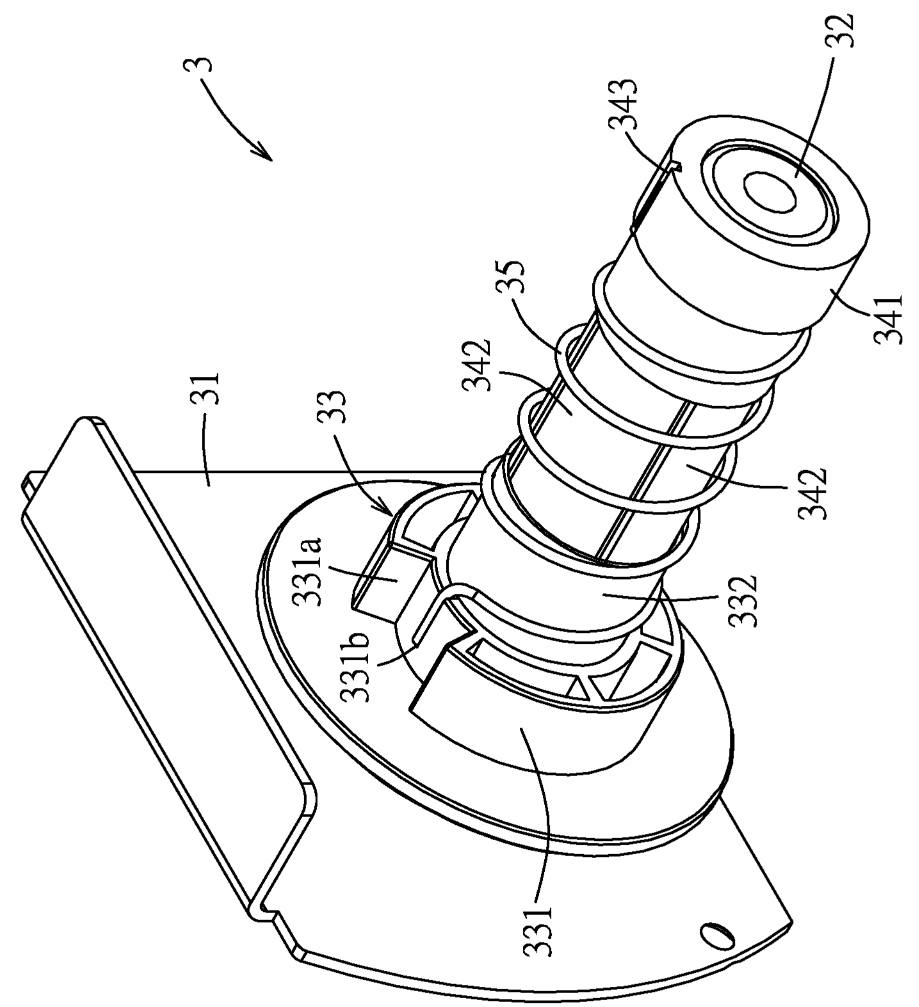
FIG. 12 is a perspective view of a rotating support module of the first embodiment.
Figure 13:
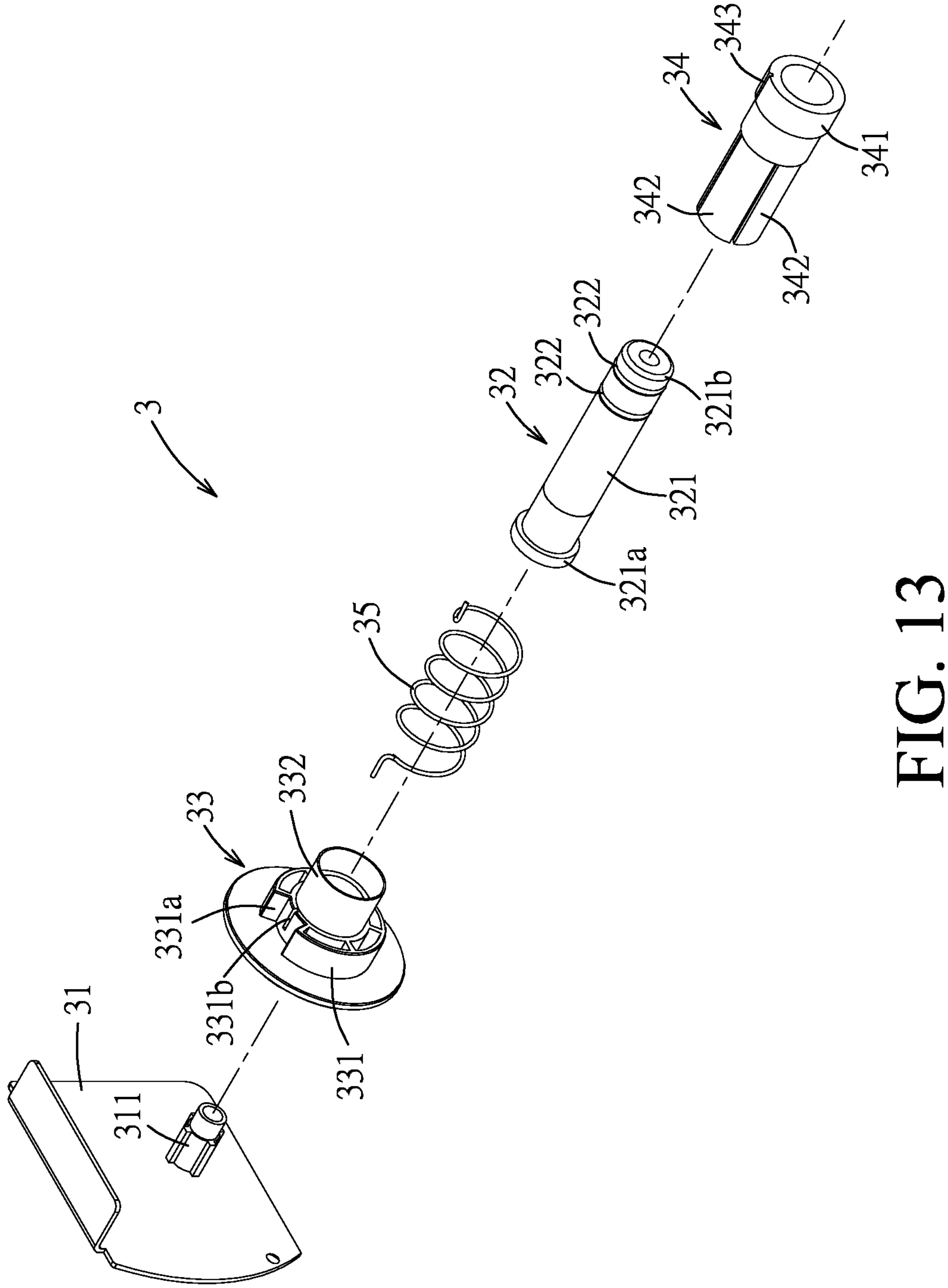
FIG. 13 is an exploded perspective view of the rotating support module.
Figure 14:
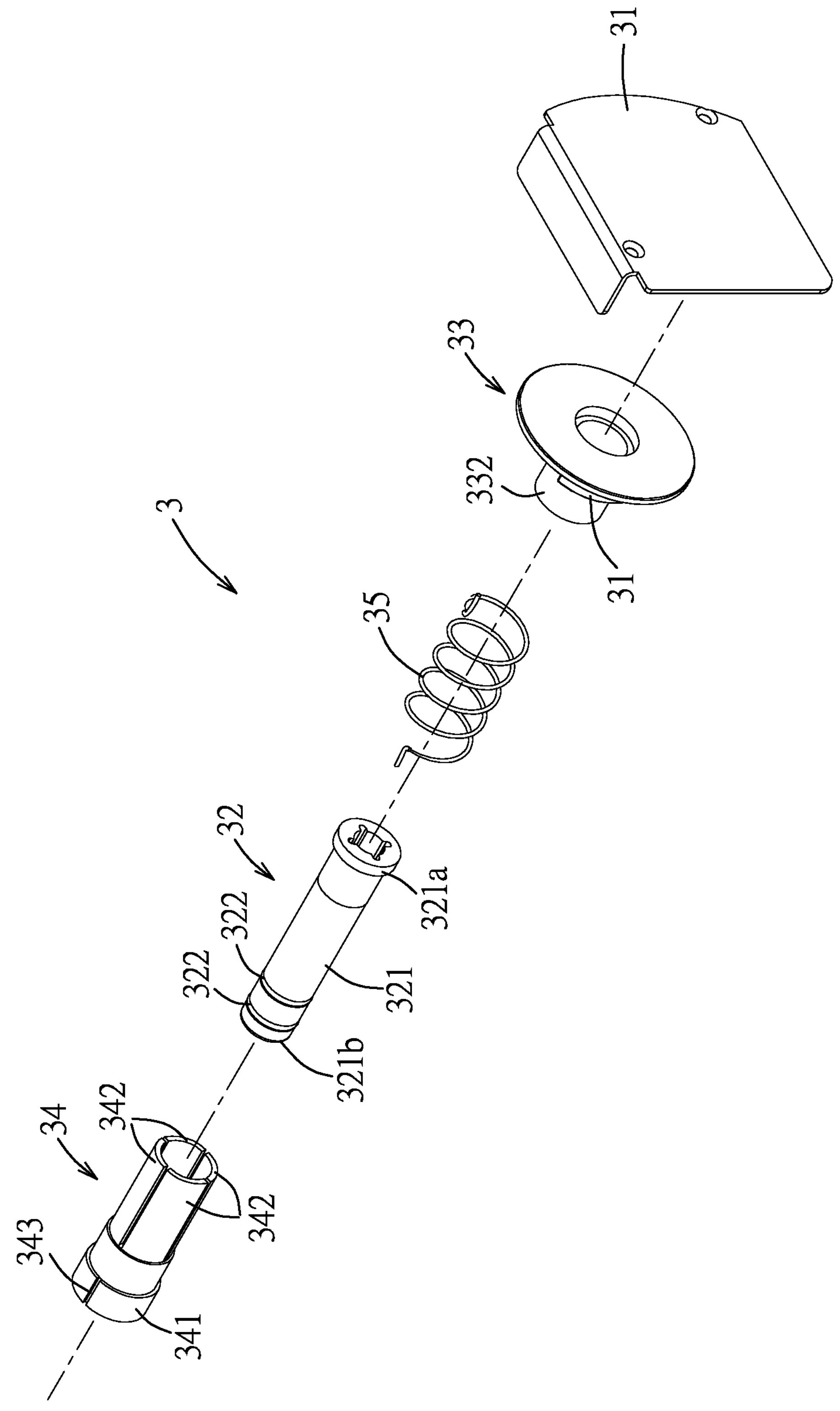
FIG. 14 is an exploded perspective view similar to FIG. 13, but taken from another angle.
Figure 15:
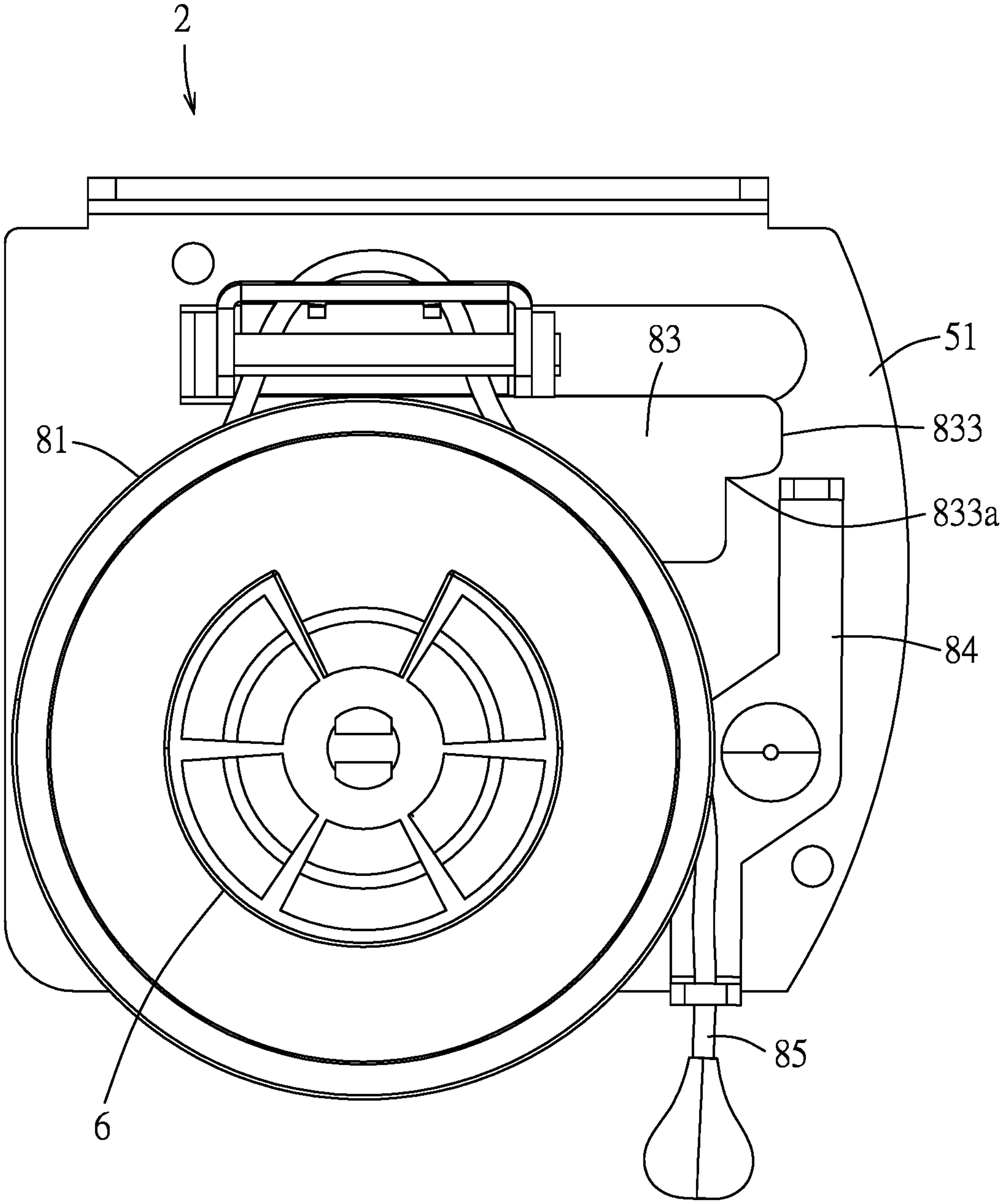
FIG. 15 is a side view illustrating the blind lifting control module in a non-operated state.
Figure 18:
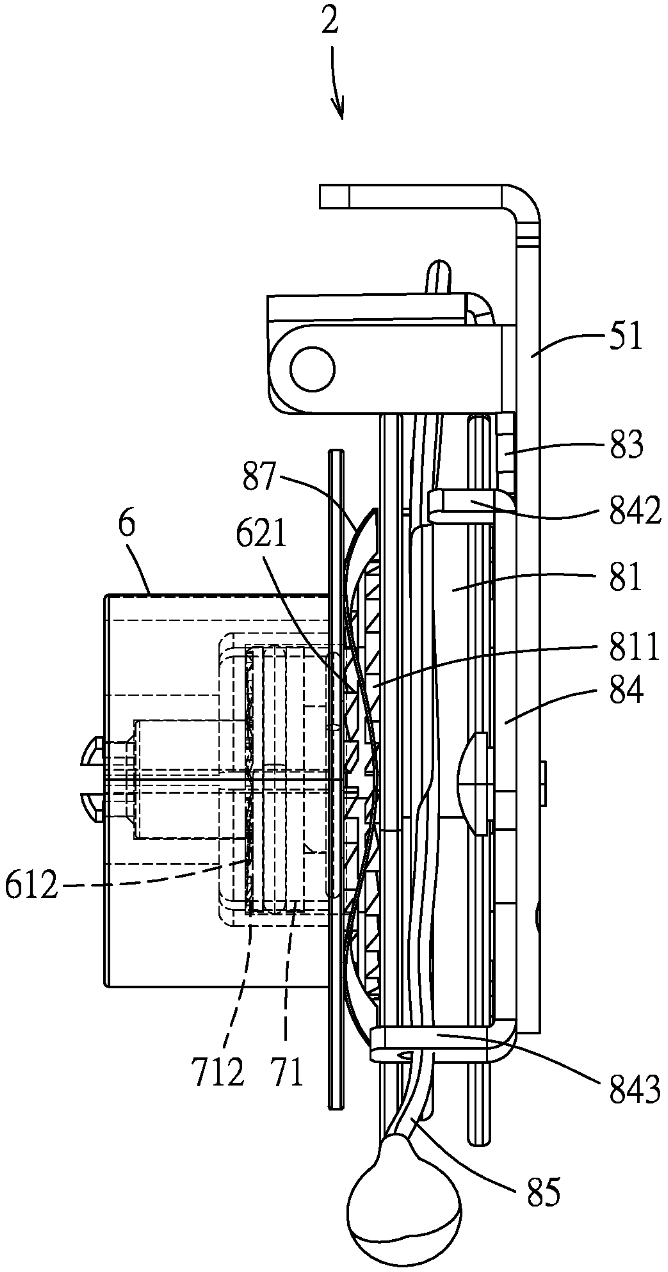
FIG. 18 is a front view of FIG. 17.
Figure 19:
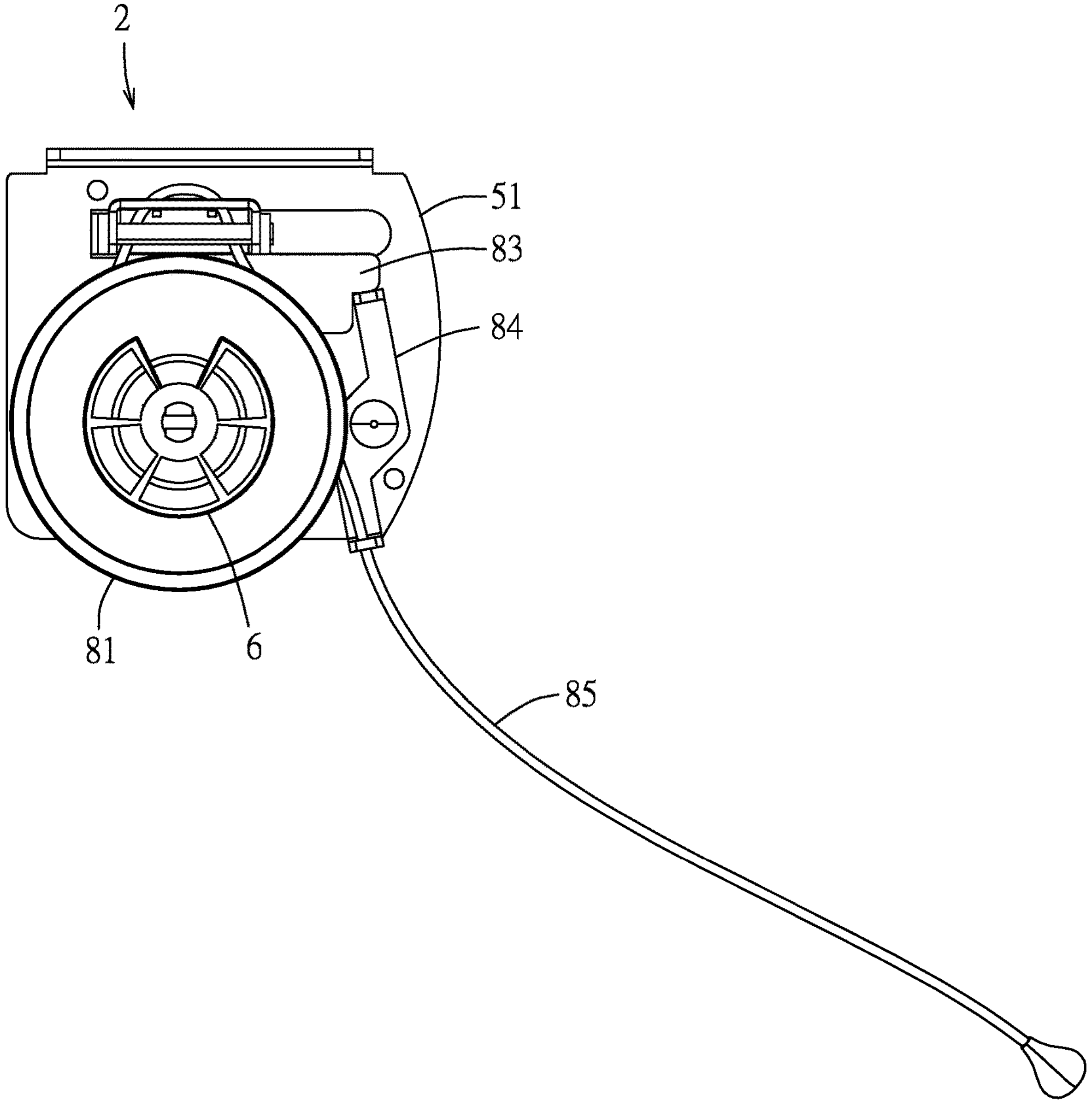
FIG. 19 is a side view illustrating the state where a pull cord is pulled to the end.
Figure 20:
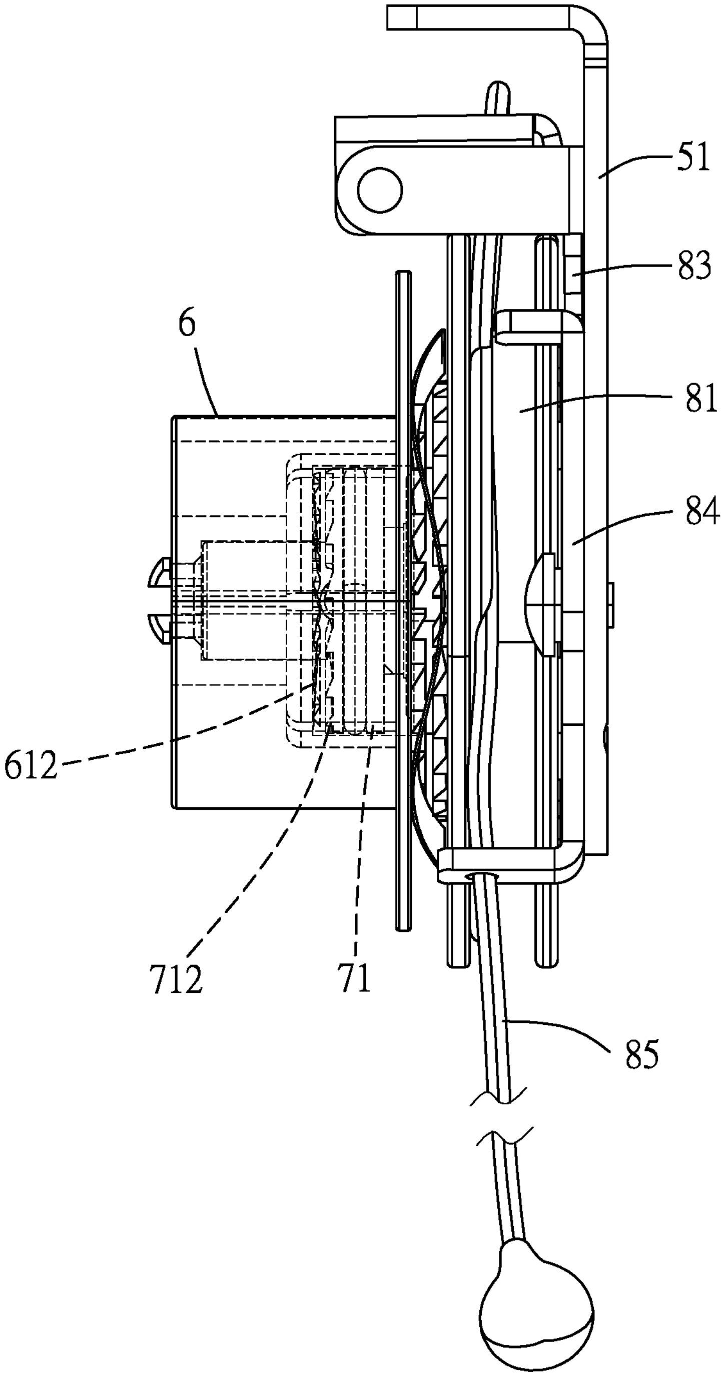
FIG. 20 is a front view of FIG. 19.
Figure 21:
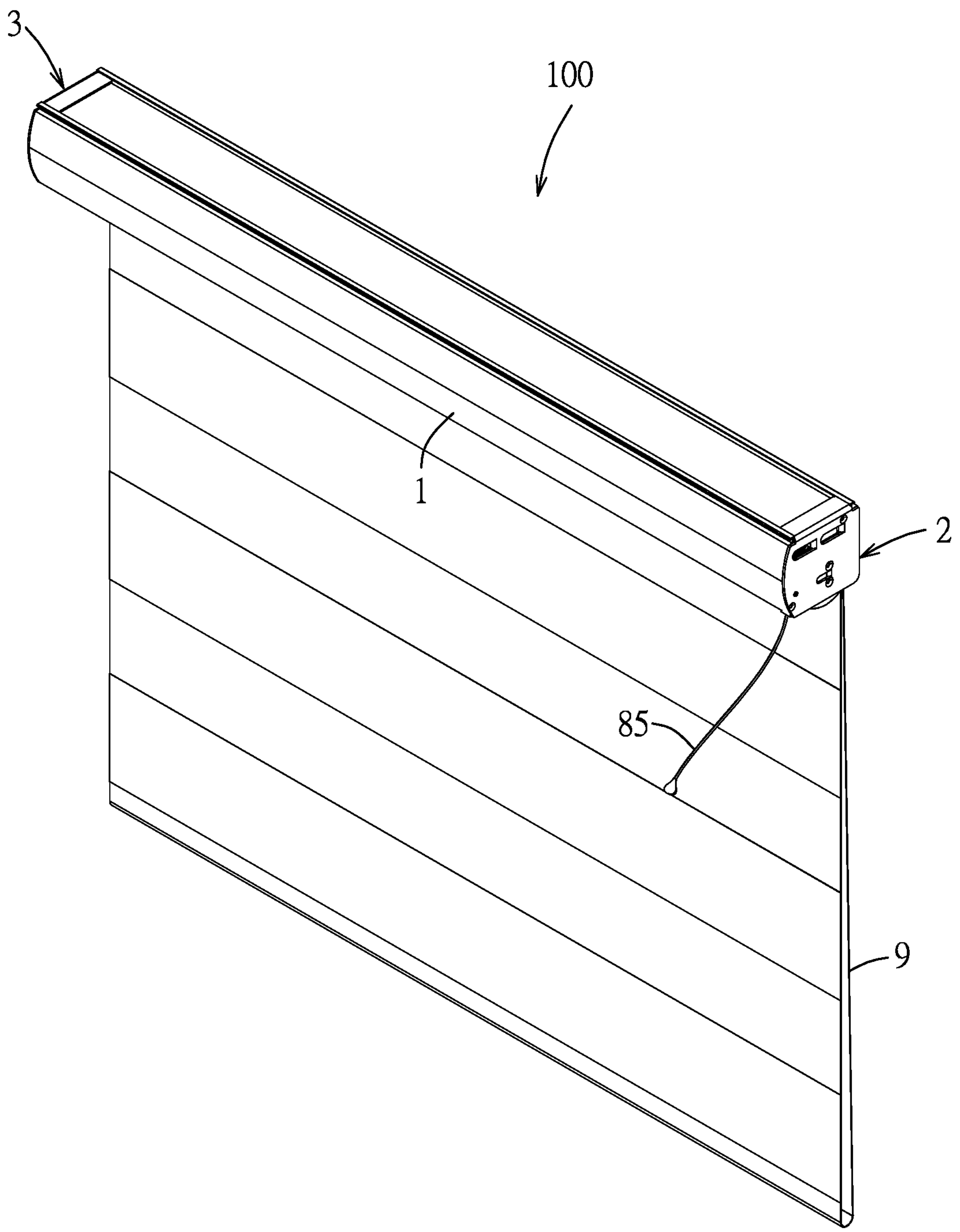
FIG. 21 is a perspective view illustrating the state where a blind is lowered.
Figure 22:
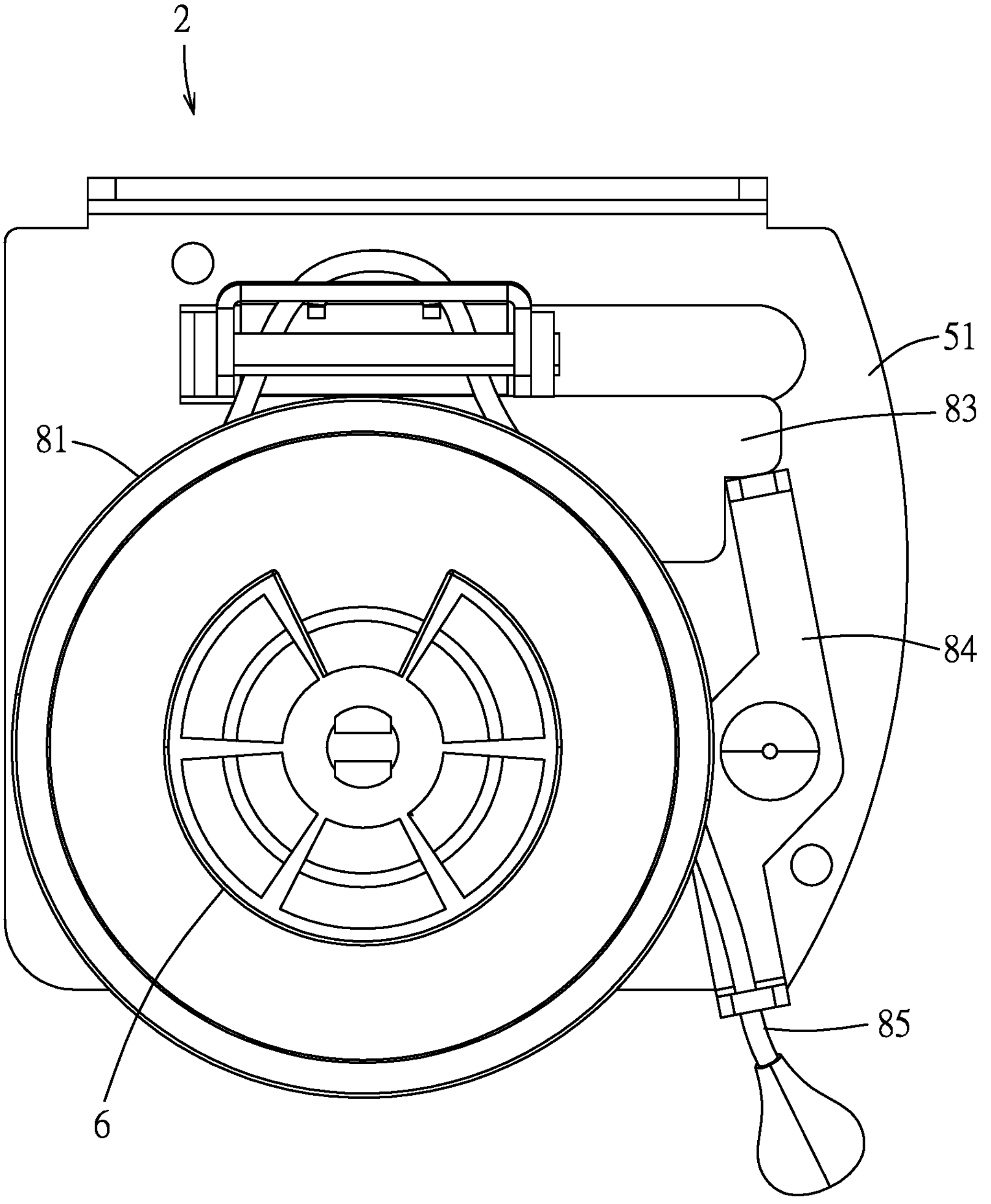
FIG. 22 is a side view illustrating the state where the pull cord is released.
Figure 23:
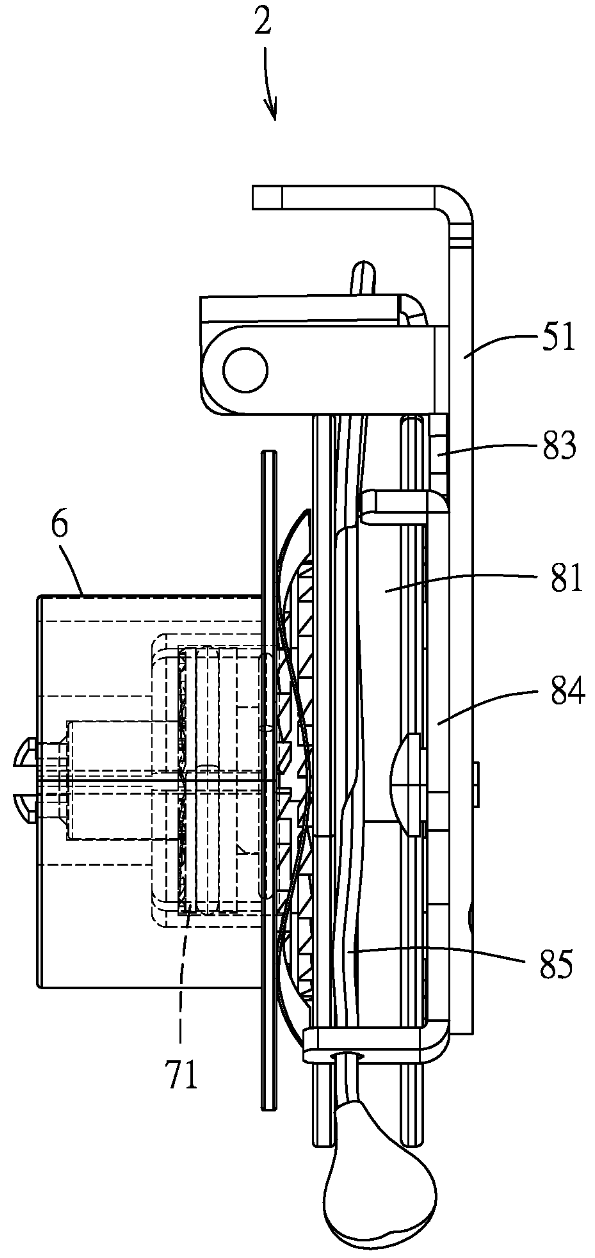
FIG. 23 is a front view of FIG. 22.

With reference to FIGS. 7, 17 and 18, the pull cord is applied with an outwardly-inclined downward pulling force (remote from the driving reel 81) to turn the pull portion 843 outward, and the hindering portion 842 is turned to abut against the thrust member 83 so as to position the thrust member 83 in the initial position such that the driving reel 81 is in the normal position and free from action with the transmitting wheel 6. Thus, the driving reel 81 is rotated through the pulling force applied to the pull cord 85 without rotation of the transmitting wheel 6 and the horizontal axle 4. Rotation of the driving reel 81 brings about winding of the transmitting member 82 on the shaft portion 521 and movement of the anti-backward wheel 71 to the released position. With reference to FIGS. 19 to 21, when the pulling force is applied to the pull cord 85 to the end, the anti-backward wheel 71 is moved to the released position. At this stage, the transmitting wheel 6 is rotatable freely such that the blind 9 on the horizontal axle 4 is lowered by virtue of its weight. With the speed reducing means of the rotating support module 3 to reduce the rotational speed of the horizontal axle 4, the blind 9 is lowered slowly. With reference to FIGS. 22 and 23, when the pulling force is released from the pull cord 85, the driving reel 81 is rotated in an opposite rotational direction by means of the reel biasing member 86 to reel the pull cord 85 and the transmitting member 82 is released (see FIG. 7) so as to return the anti-backward wheel 71 to the anti-backward position to stop rotation of the transmitting wheel 6 and position the blind 9 at a desired height position. In other words, the anti-backward wheel 71 is kept in the anti-backward position until the pull cord 85 is pulled to the end.

Figure 16:
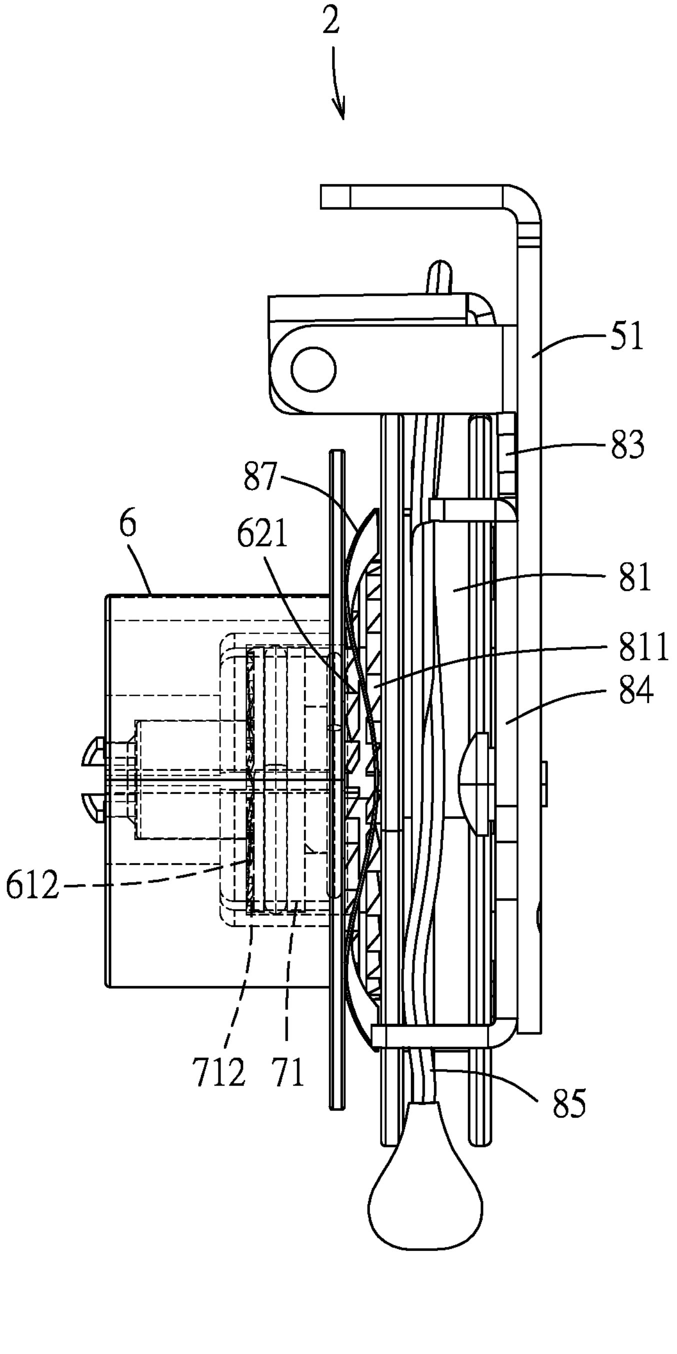
FIG. 16 is a front view of FIG. 15.
Figure 24:
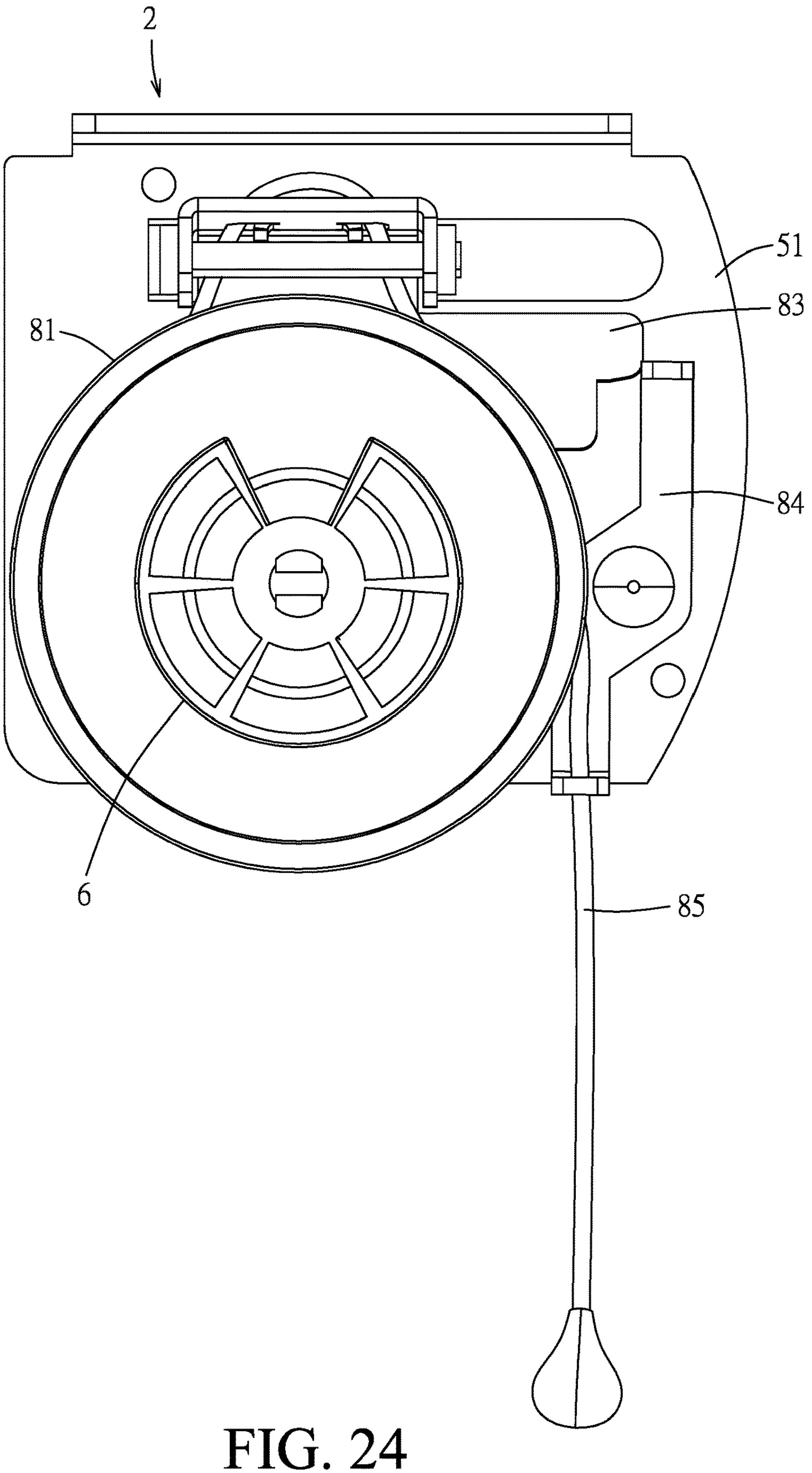
FIG. 24 is a side view illustrating the blind lifting control module in a blind-lifting operated state.
Figure 25:
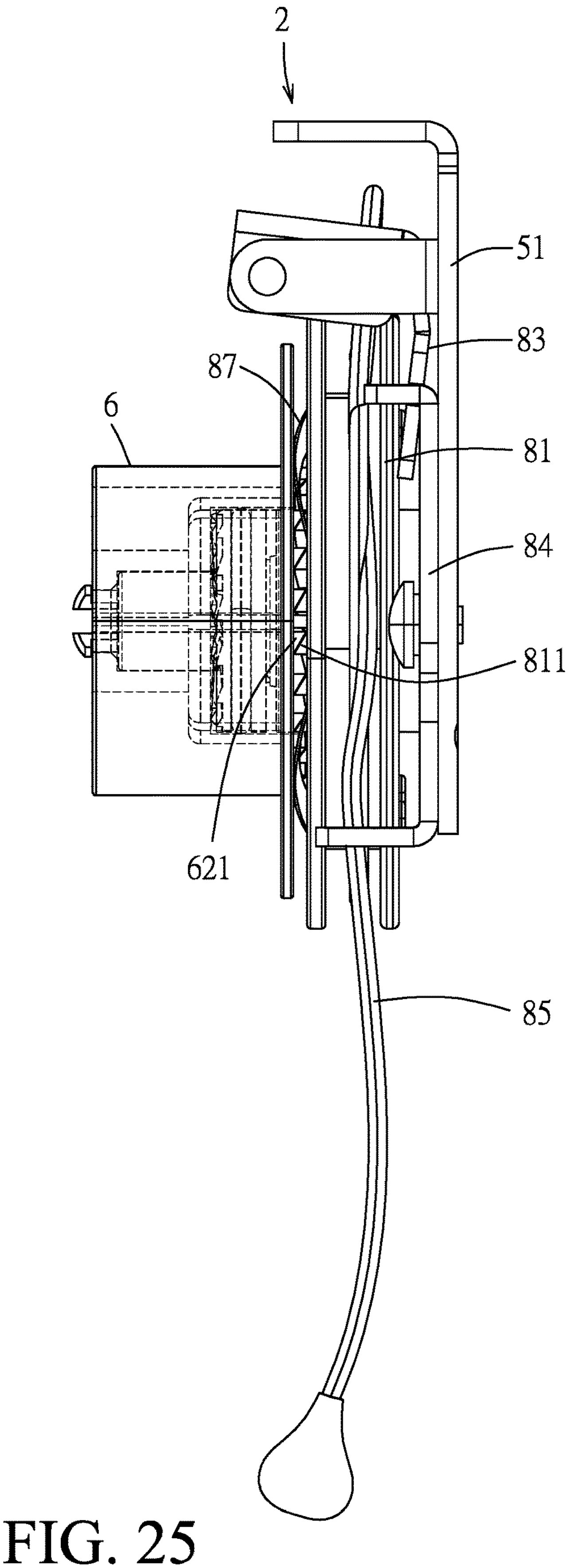
FIG. 25 is a front view of FIG. 24.
Figure 26:
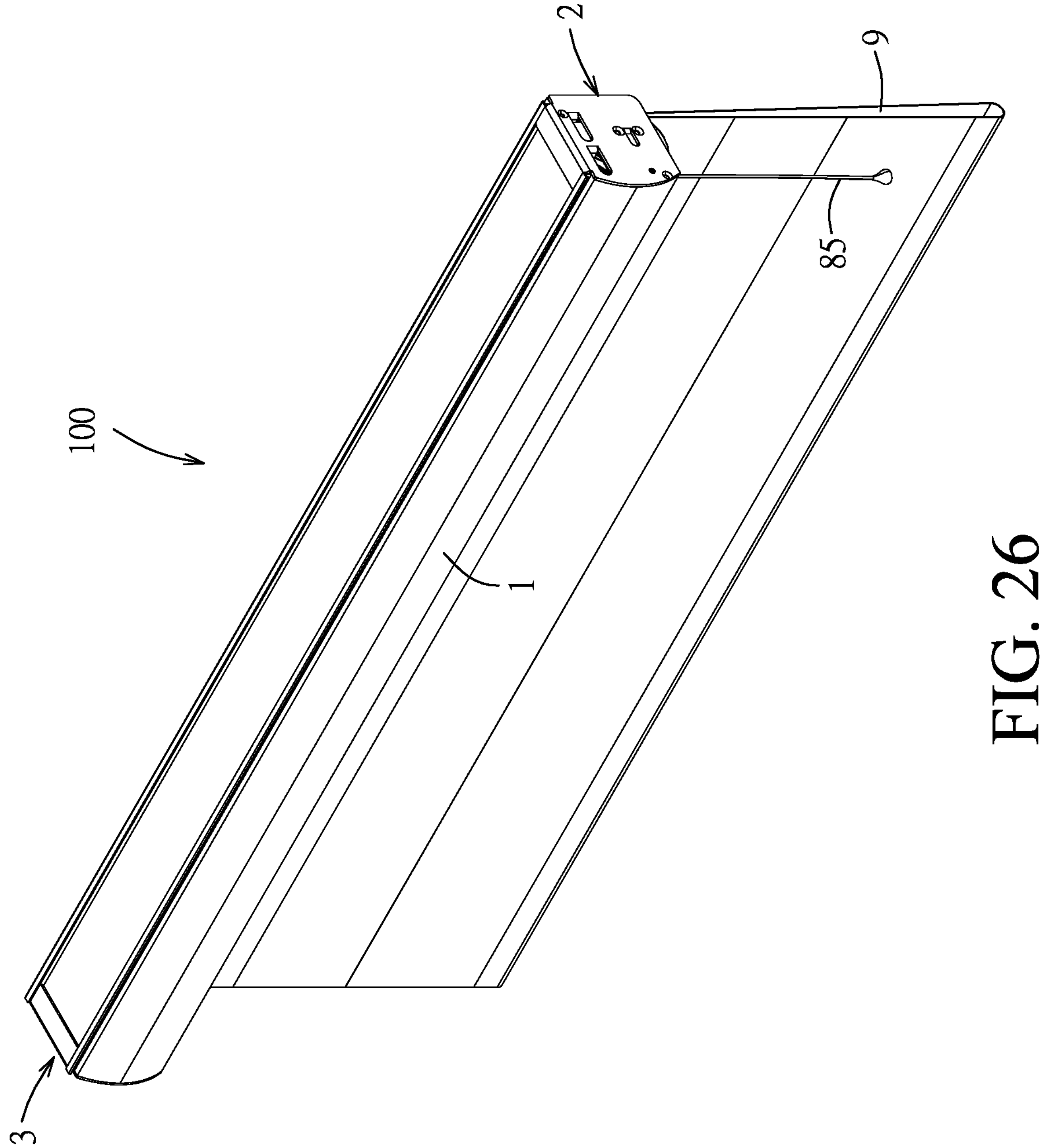
FIG. 26 is a perspective view illustrating the state where the blind is lifted.

With reference to FIGS. 24 to 26, the operator applies an uprightly downward pulling force to the pull cord 85 to lift the blind 9, the hindering member 84 is turned to the keeping-off position where the hindering portion 842 is remote from the thrust portion 832, and the thrust member 83 is moved to the thrusting position so as to move the driving reel 81 to the driving position. With the meshing engagement of the fourth and second ratchet portions 811, 621, the driving reel 81 drives rotation of the transmitting wheel 6 and the horizontal axle 4 in the clockwise rotational direction so as to reel and lift the blind 9. When the pull cord 85 is released, as shown in FIG. 16, the driving reel 81 is returned to the normal position by means of the elastomeric biasing ring 87, the thrust member 83 is returned to the initial position, and the pull cord 85 is reeled on the driving reel 81. Similarly, the transmitting wheel 6 is interfered with the anti-backward wheel 71 and is not rotated backward by means of the horizontal axle 4 so as to keep the blind 9 at an appropriate height position. In case of a long blind 9, the operations of pulling downward and releasing of the pull cord 85 should be repeated so as to lift the blind 9 with a relative long distance.

As mentioned above, the pull cord 85 is reeled on the driving reel 81 in the non-operated state, which can avoid entangling children and objects nearby. The operation of lifting the blind 9 is convenient to conduct.

Figure 27:
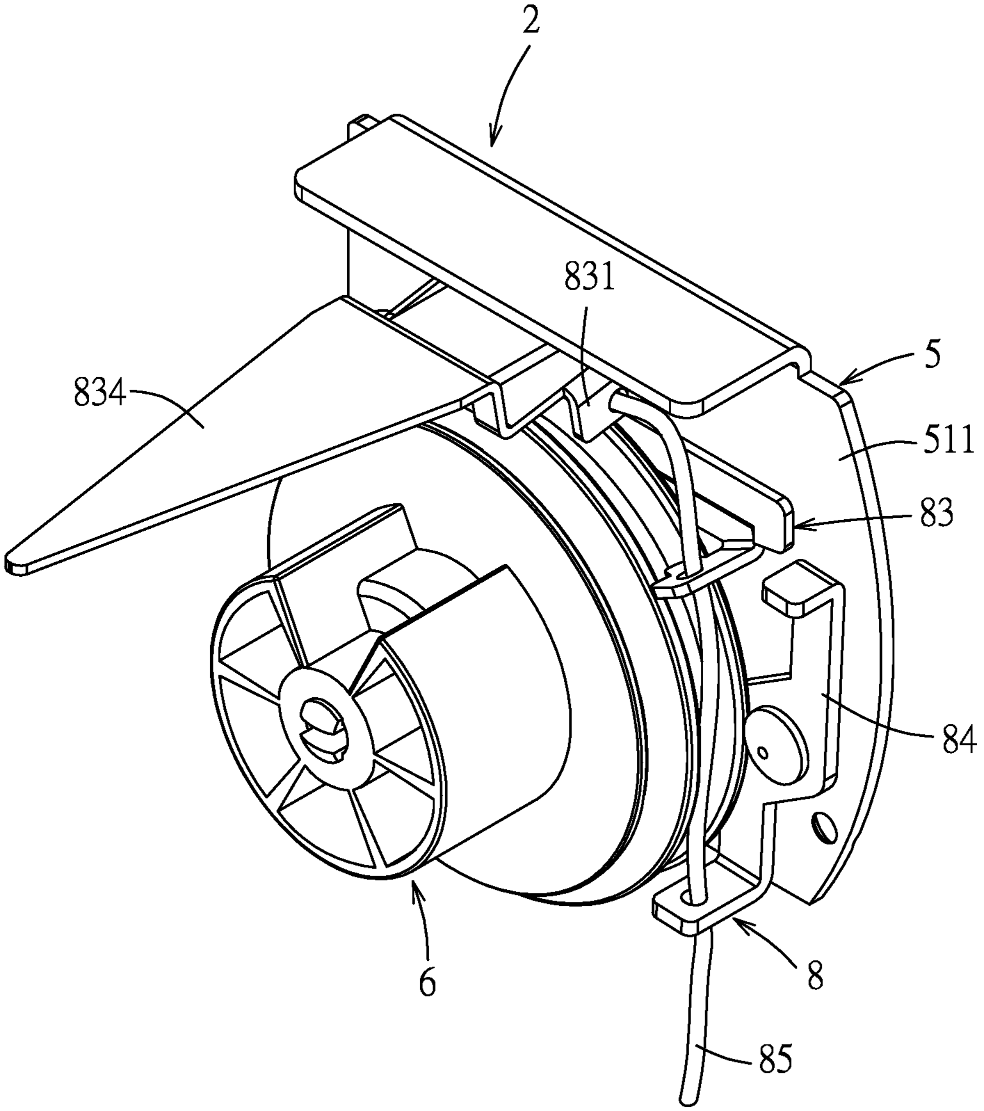
FIG. 27 is a perspective view of the blind lifting control module of a second embodiment.
Figure 28:
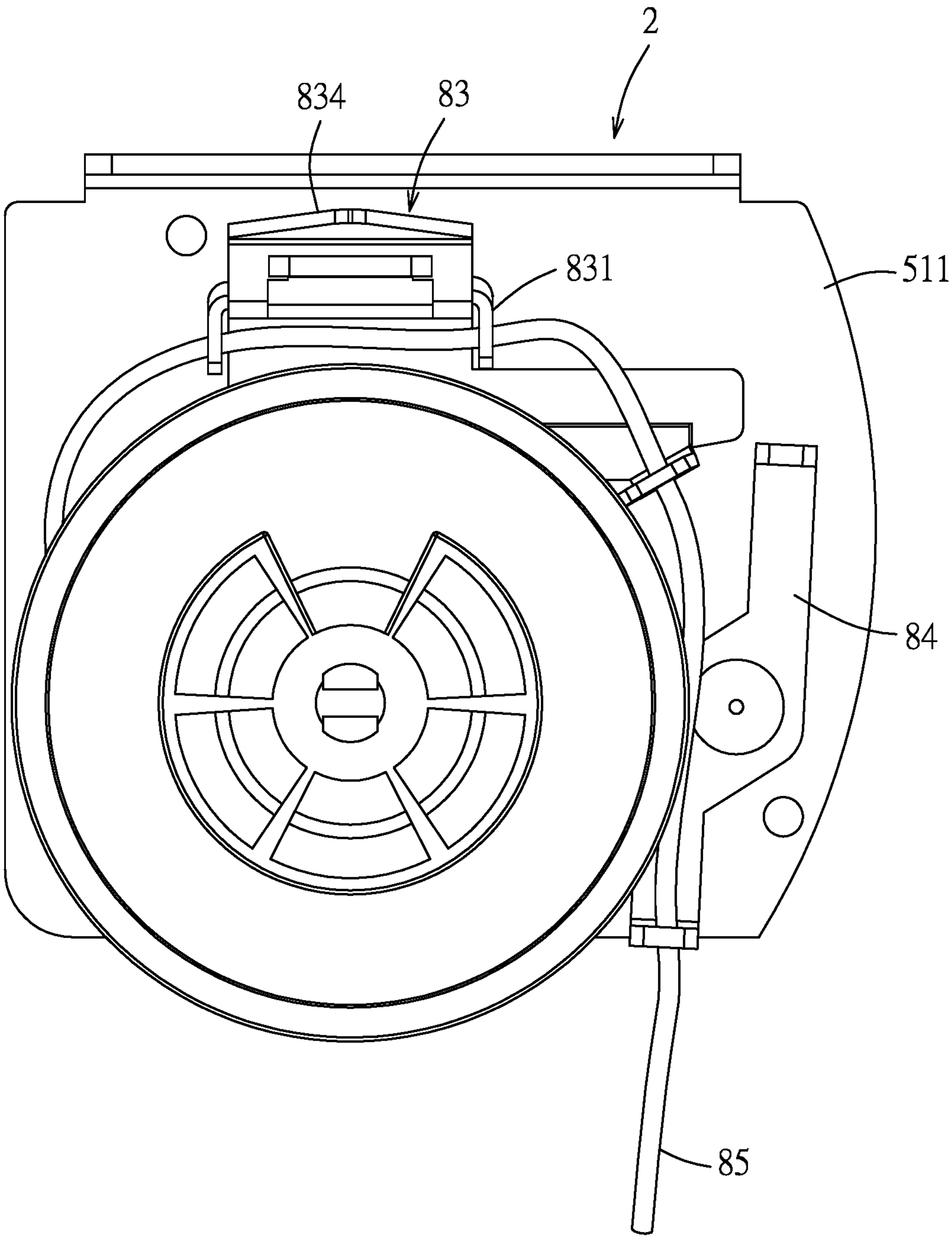
FIG. 28 is a side view of the blind lifting control module of the second embodiment.
Figure 29:
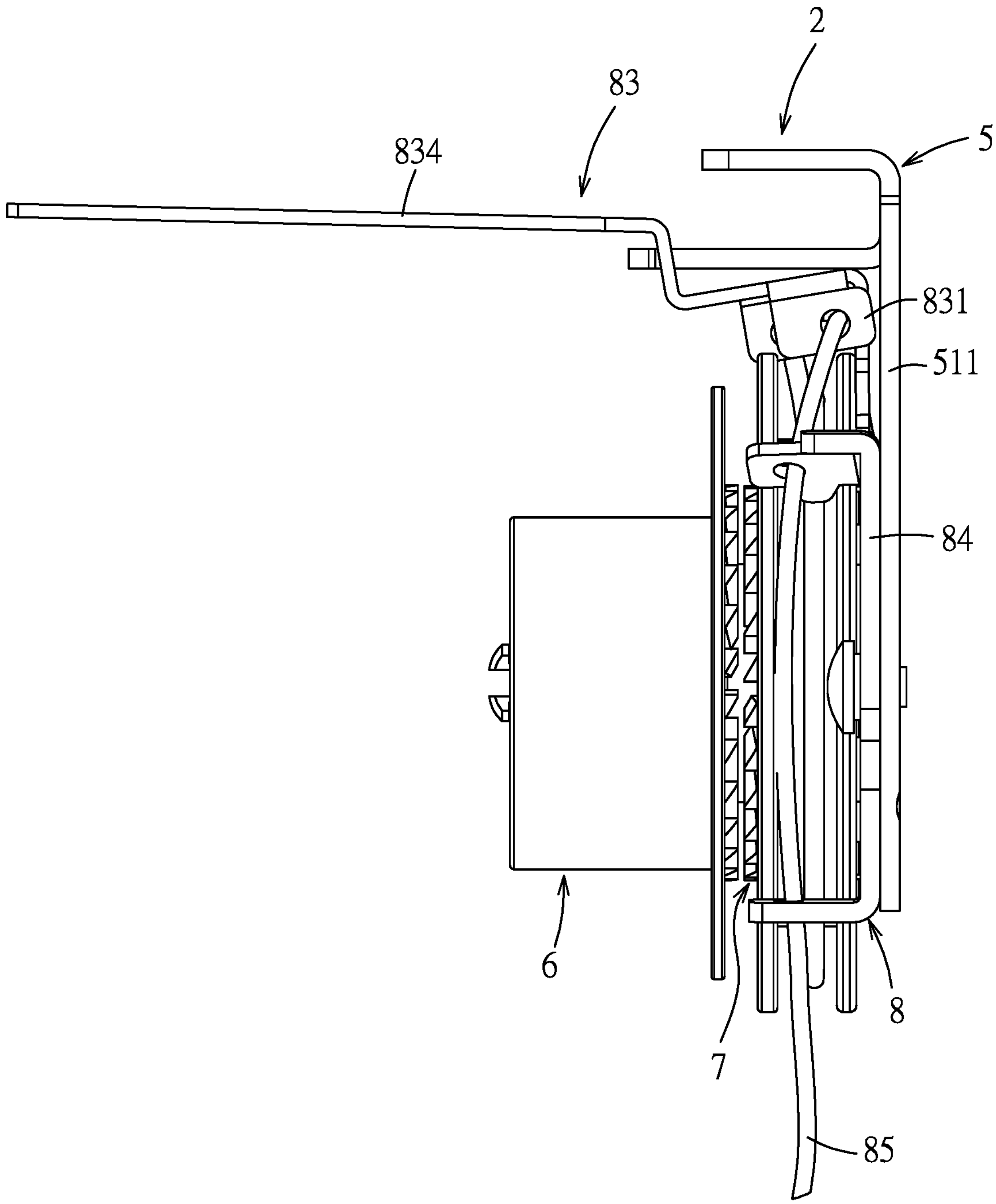
FIG. 29 is a front view of the blind lifting control module of the second embodiment.

With reference to FIGS. 27 to 29, in a second embodiment, an elastic leaf portion 834 is formed on and extends from the forced portion 831 of the thrust member 83. The elastic leaf portion 834 has a terminal end which abuts against the top wall 13 of the rail 1 (see FIG. 2) so as to generate a counteracting force when the thrust member 83 is in the thrusting position, which urges the thrust member 83 back to the initial position once the thrust member 83 is free from action with the pull cord 85.

Figure 30:
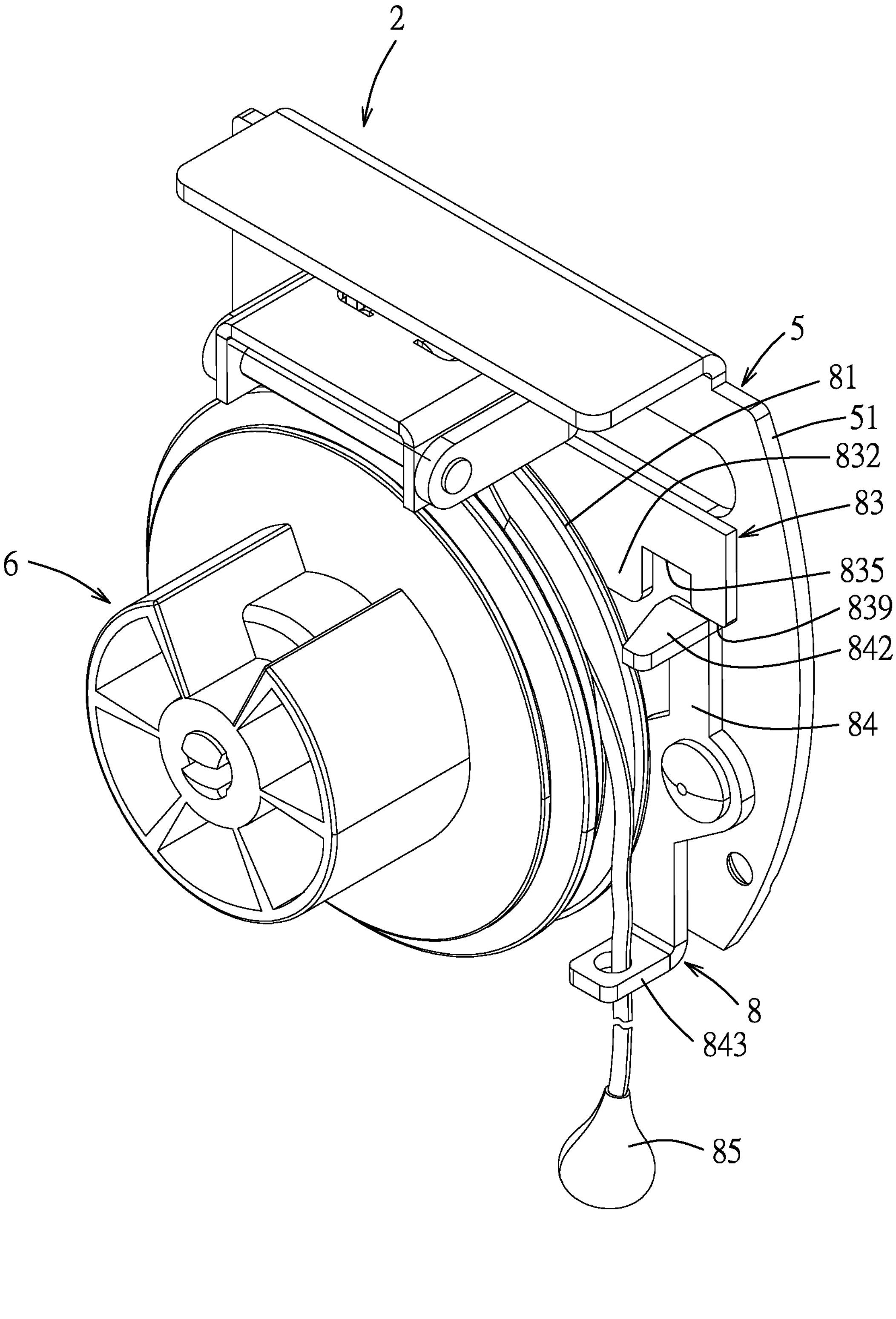
FIG. 30 is a perspective view of the blind lifting control module of a third embodiment.
Figure 31:
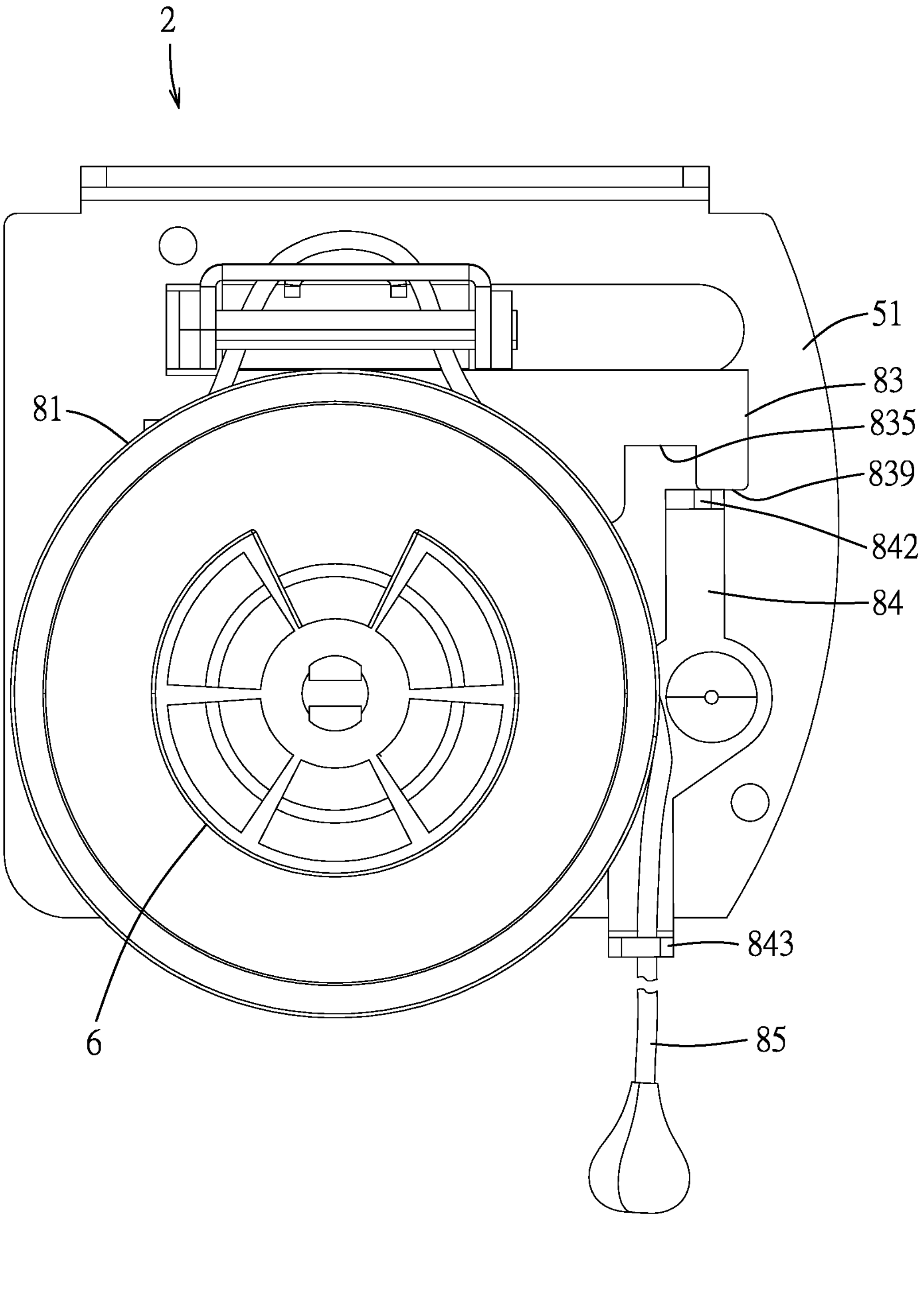
FIG. 31 is a side view illustrating a hindering member in a hindering position.
Figure 32:
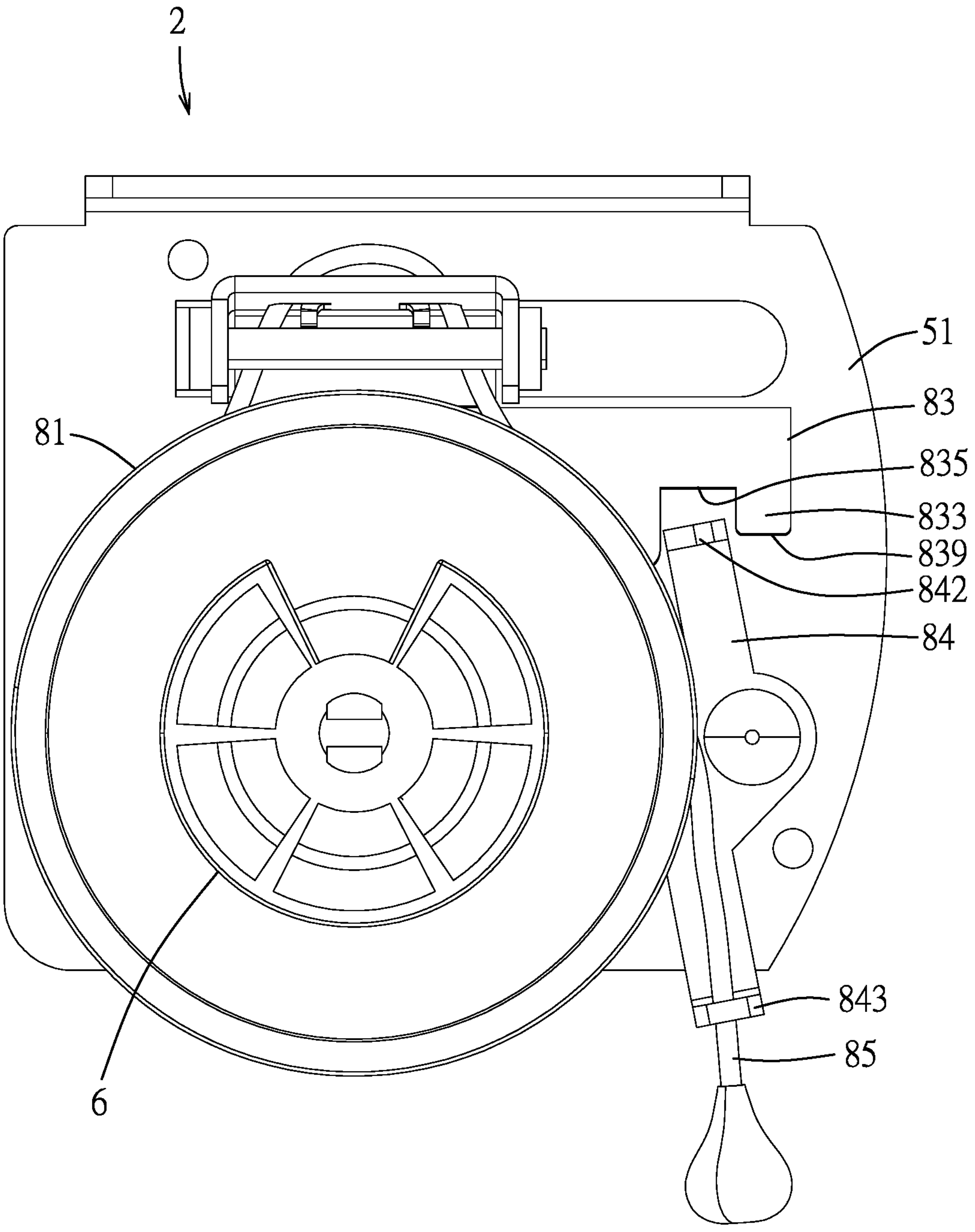
FIG. 32 is a side view illustrating the hindering member in a keeping-off position.

With reference to FIGS. 30 to 32, in a third embodiment, the thrust portion 832 of the thrust member 83 has a keeping-off notch 835 cut from a lower edge 839 thereof that is close to the hindering portion 842 of the hindering member 84. As shown in FIG. 31, when an uprightly downward pulling force is applied to the pull cord 85, the pull portion 843 of the hindering member 84 is turned slightly inwardly so as to turn the hindering member 84 to the hindering position, where the hindering portion 842 abuts against the lower edge 839, and thus the thrust member 83 is positioned in the initial position. As shown in FIG. 32, when an outwardly-inclined downward pulling force (remote from the driving reel 81) is applied to the pull cord 85, the pull portion 843 of the hindering member 84 is turned slightly outwardly so as to turn the hindering member 84 to the keeping-off position, where the hindering portion 842 is received in the keeping-off notch 835, and thus the thrust member 83 is moved to the thrusting position to move the driving reel 81 to the driving position.

Figure 33:
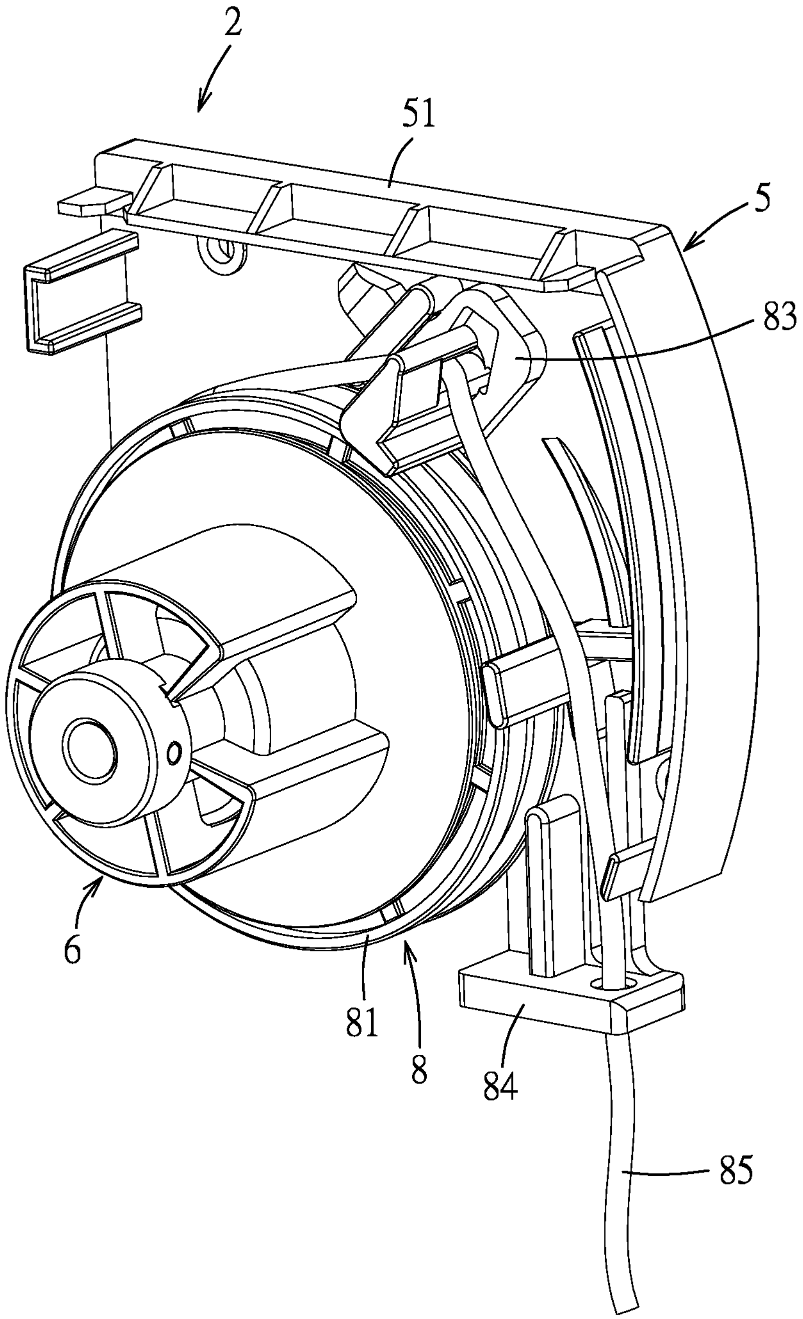
FIG. 33 is a perspective view of the blind lifting control module of a fourth embodiment.
Figure 34:
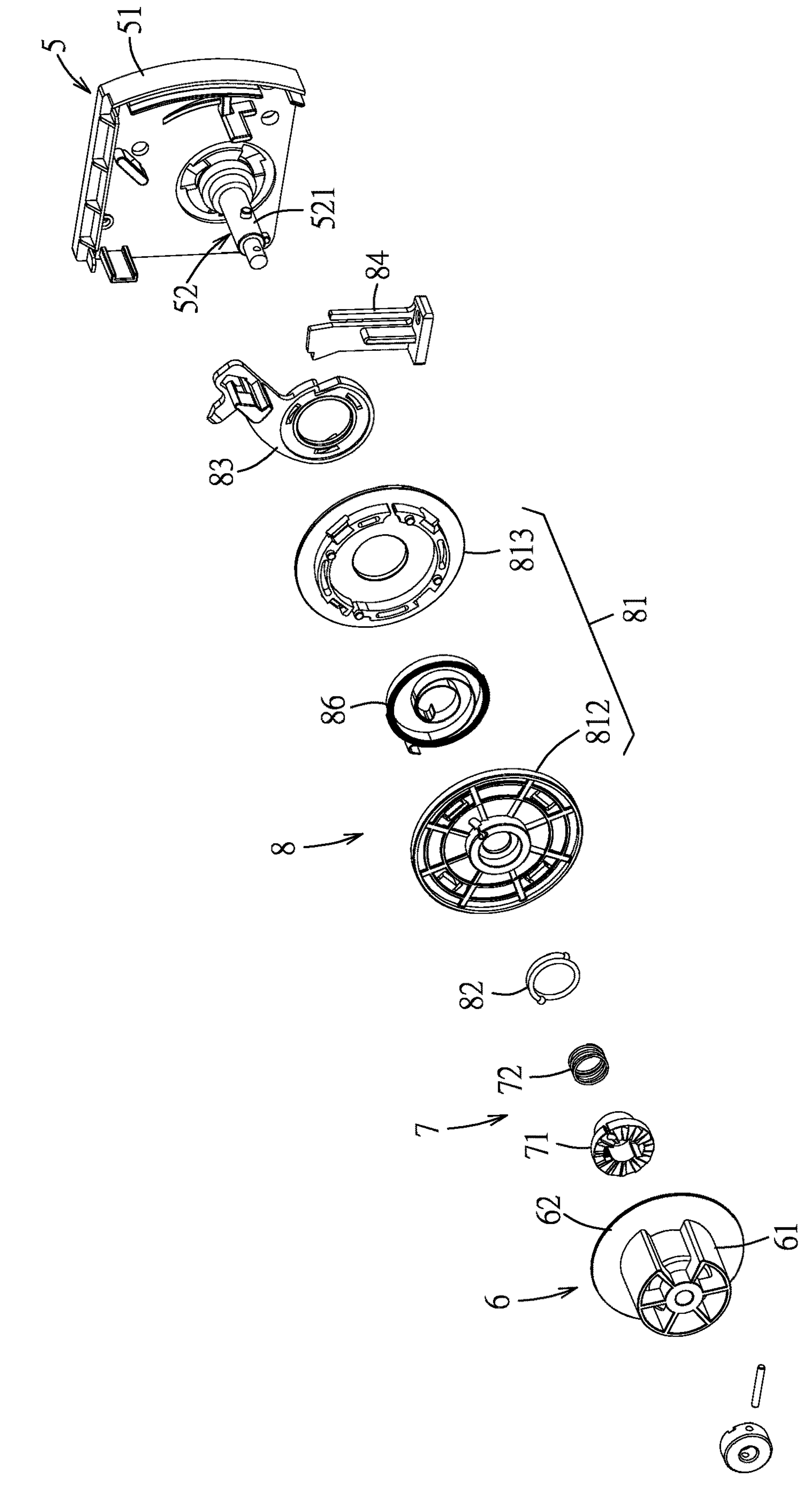
FIG. 34 is an exploded perspective view of the fourth embodiment.
Figure 35:
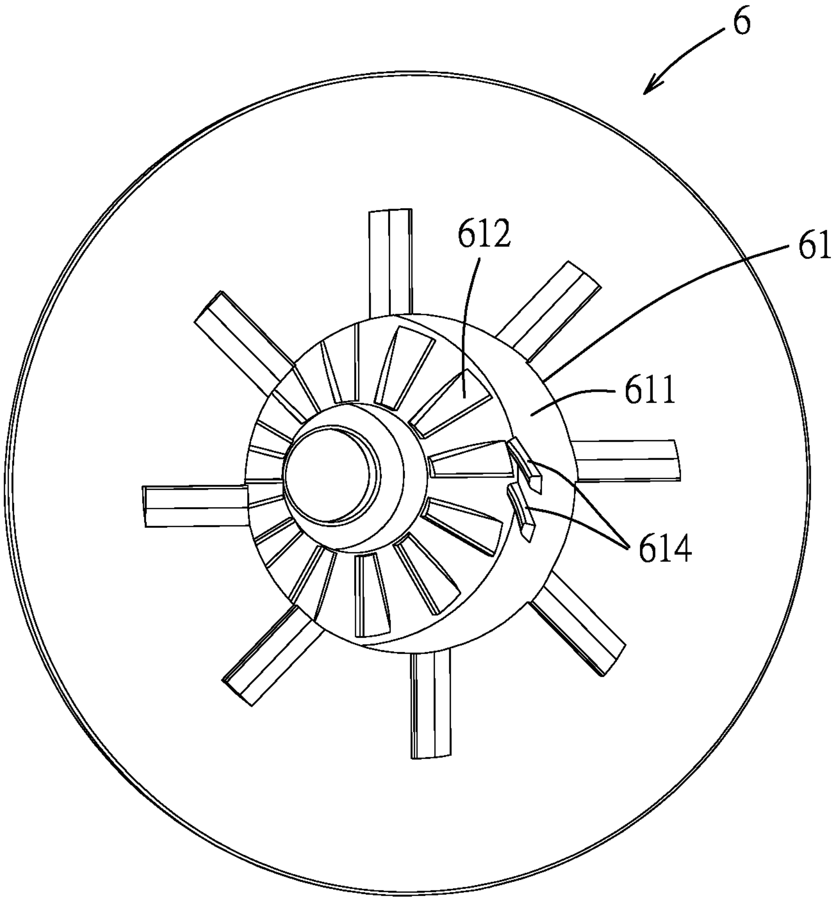
FIG. 35 is a perspective view illustrating a transmitting wheel of the blind lifting control module.

With reference to FIGS. 33 to 35, in a fourth embodiment, the biasing returning member 72 is a coil spring sleeved around the shaft portion 521 and axially disposed between the anti-backward wheel 71 and a driving reel 81 of the driving unit 8.

The axle connecting body 61 of the transmitting wheel 6 has an inner surrounding wall extending axially and defining the receiving groove 611 therein, and a plurality of elastomeric muffling members 614 formed on the inner surrounding wall and adjacent to the first ratchet portion 612. In this embodiment, the axle connecting body 61 has three pairs of the muffling members 614 (only one pair is shown) angularly spaced from one another by 120 degrees, and slightly inclined toward the rotational direction of the anti-backward wheel 71. The muffling members 614 may be made from silicone or rubber material to retard the returning rotation of the anti-backward wheel 71 such that, during the lifting of the blind 9, a buffering action is applied to the anti-backward wheel 71 to decrease impact to the first ratchet portion 612 so as to provide muffled sound effects.

Figure 36:
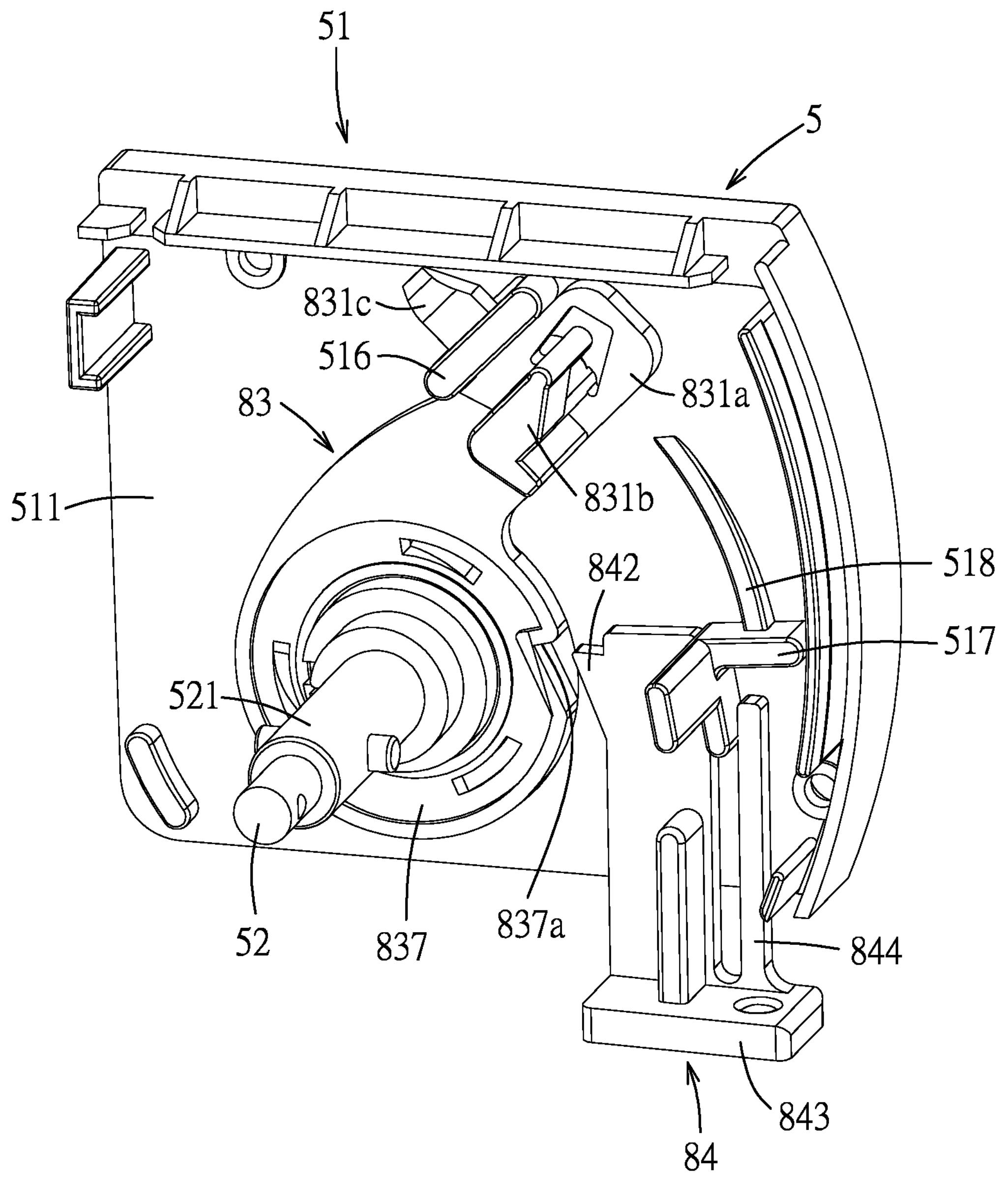
FIG. 36 is a perspective view illustrating a supporting unit, a thrust member and a hindering member of the blind lifting control module.
Figure 37:
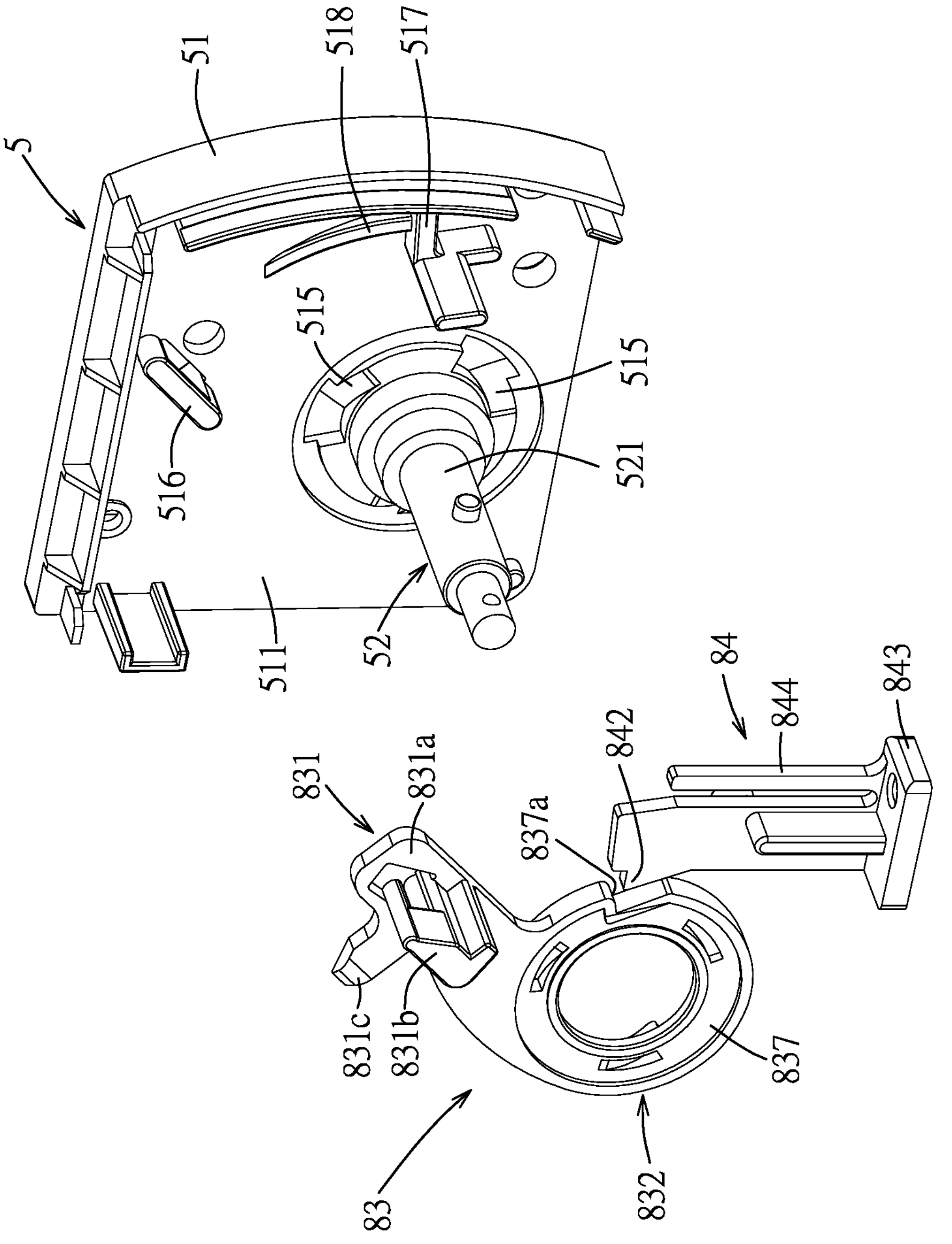
FIGS. 37 and 38 are exploded perspective views of FIG. 36.
Figure 38:
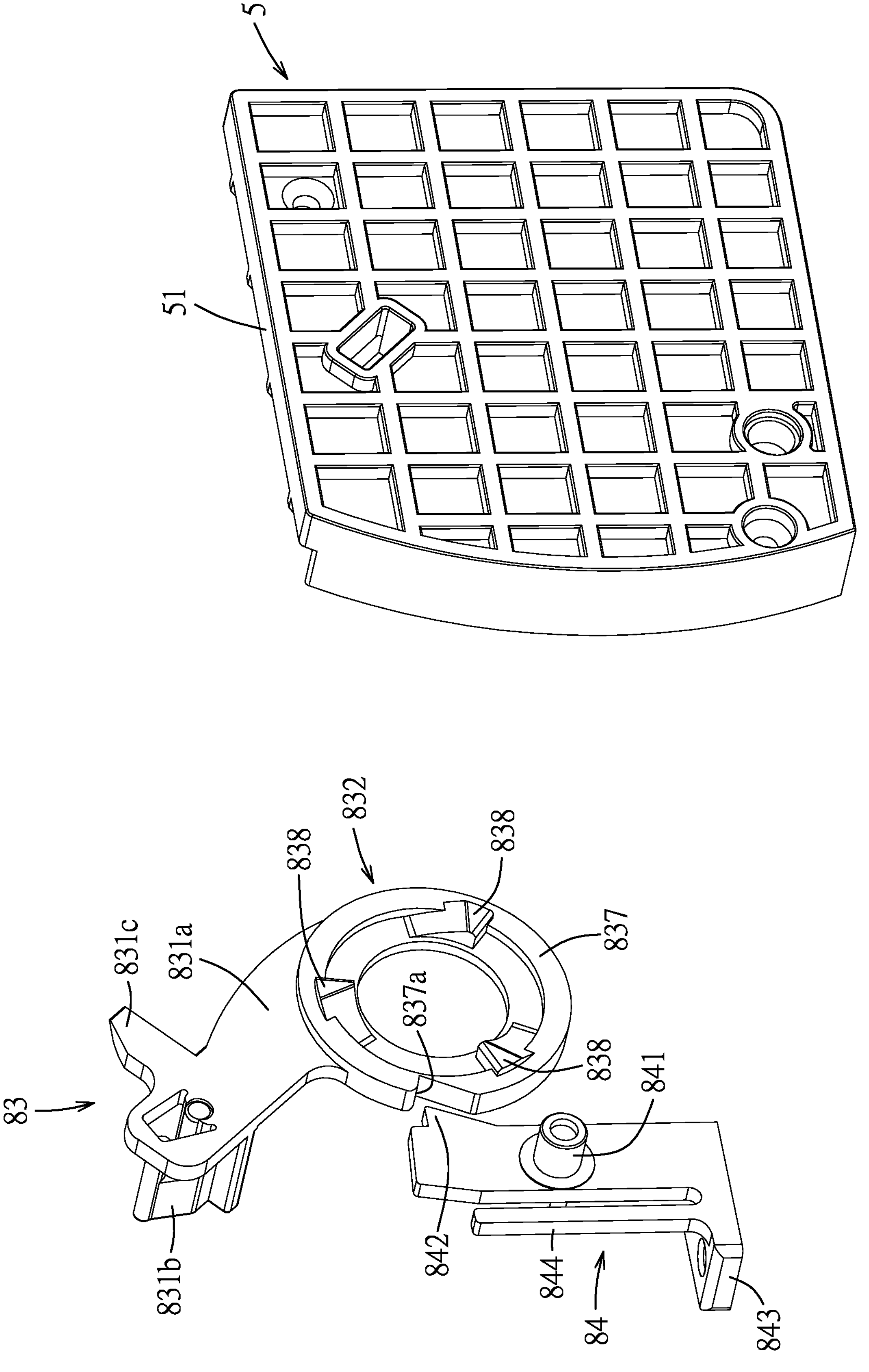

With reference to FIGS. 36 to 38, in this embodiment, the mounting shaft 52 is integrally formed with the base seat 51, and the mounting plate 511 of the base seat 51 has a plurality of annular grooves 515 which surround the shaft portion 521 and are angularly spaced from each other. The base seat 51 further has a positioning frame 516 which is disposed on the mounting plate 511, a stop block 517 which is angularly spaced apart from the positioning frame 516 and proximate to the hindering member 84, and a slope block 518 which extends angularly to have an end connected with the stop block 517. As shown in FIG. 37, each annular groove 515 has a depth which is gradually reduced in a clockwise direction. The thrust portion 832 of the thrust member 83 has an annular portion 837 which is rotatable about and sleeved on the shaft portion 521, and a plurality of sliding protrusions 838 which project from the annular portion 837 and which are respectively and slidably engaged in the annular grooves 515. The annular portion 837 has an engaging notch (837*a*) cut from an outer periphery thereof that is close to the hindering portion 842 of the hindering member 84 so as to be engaged with the hindering portion 842 when the hindering member 84 is turned to the hindering position. The forced portion 831 of the thrust member 83 has an extension segment (831*a*) which extends radially and outwardly from an outer periphery of the annular portion 837, a cord-pulling segment (831*b*) which extends from the extension segment (831*a*) and through which the pull cord 85 (see FIG. 33) passes, and a positioned segment (831*c*) which extends from the extension segment (831*a*) and transverse to the cord-pulling segment (831*b*). As shown in FIG. 36, when the thrust member 83 is in the initial position, the positioned segment (831*c*) passes through and is positioned to the positioning frame 516, the extension segment (831*a*) abuts against the positioning frame 516, the annular portion 837 is attached to the mounting plate 511, and the sliding protrusions 838 are respectively engaged in deeper areas of the annular grooves 515. When an uprightly downward pulling force is applied to the pull cord 85 to turn the hindering member 84 to the keep-off position, and to rotate the forced portion 831 in the clockwise direction, the sliding protrusions 838 slide along the annular grooves 515 toward shallower areas to move the annular portion 837 away from the mounting plate 511 so as to thrust the driving reel 81 to the driving position. The extension segment (831*a*) abuts against and is stopped by the stop block 517 when the thrust member 83 is moved to the thrusting position for preventing excess rotation of the thrust member 83. During the rotation of the thrust member 83 from the initial position to the thrusting position, the extension segment (831*a*) is supported on the slope block 518 and is moved steadily with the annular portion 837 away from the mounting plate 511. Similar to the hindering member 84 in the first embodiment, an outwardly-inclined downward pulling force (remote from the driving reel 81) applied to the pull cord 85 brings about turning of the hindering member 84 to the hindering position, where the pull portion 843 is turned outward, and the hindering portion 842 is turned to engage in the engaging notch (837*a*) to position the thrust member 83 in the initial position. Moreover, in this embodiment, the hindering member 84 is made from a plastic material, and further has a returning post 844 deformably abutting against the stop block 517 such that, the returning post 844 is elastically bent when the hindering member 84 is turned by a pulling force from the keeping-off position to the hindering position, and is returned back its posture when the pulling force is released so as to keep the hindering member 84 in the keeping-off position.

Figure 39:
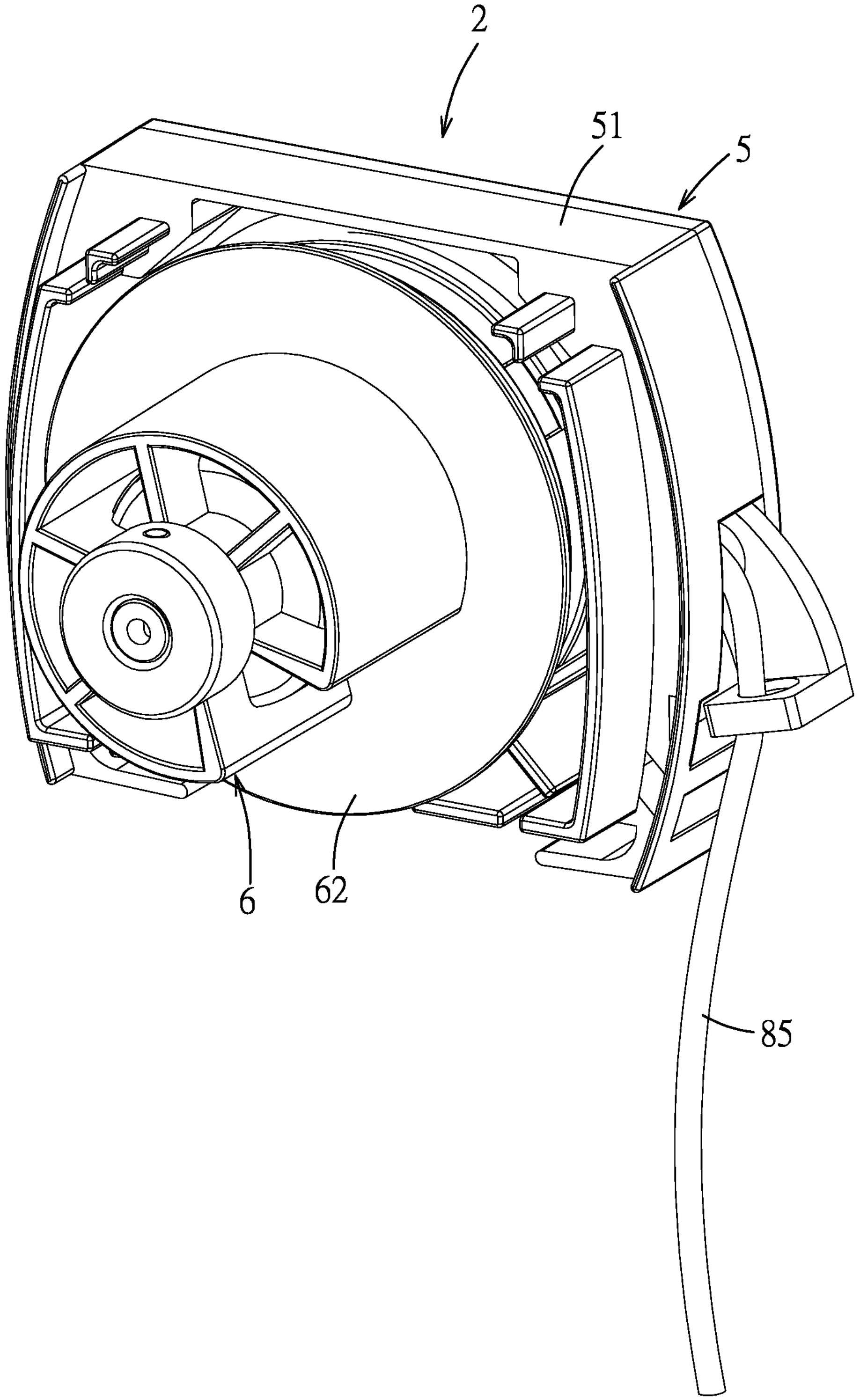
FIG. 39 is a perspective view of the blind lifting control module of a fifth embodiment.
Figure 40:
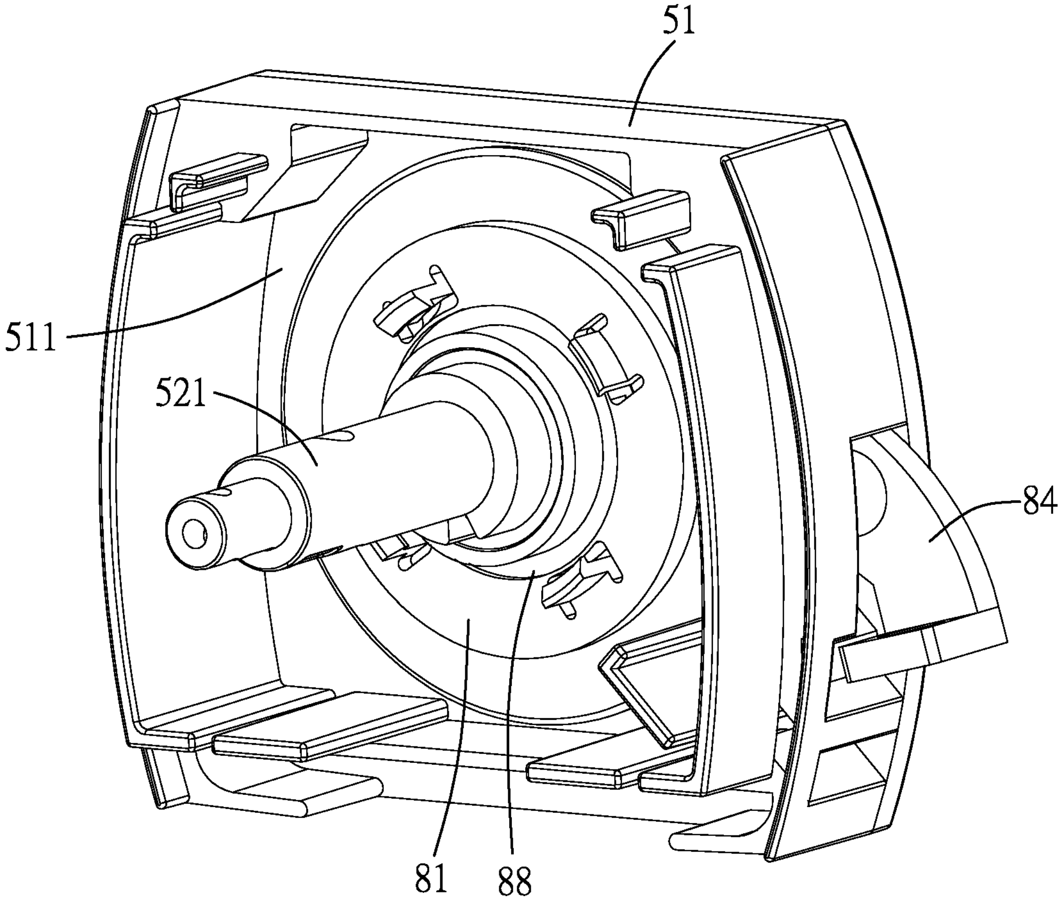
FIG. 40 is a perspective view illustrating a supporting unit, a thrust member, a hindering member, a transmitting ring and a driving reel of the blind lifting control module.
Figure 41:
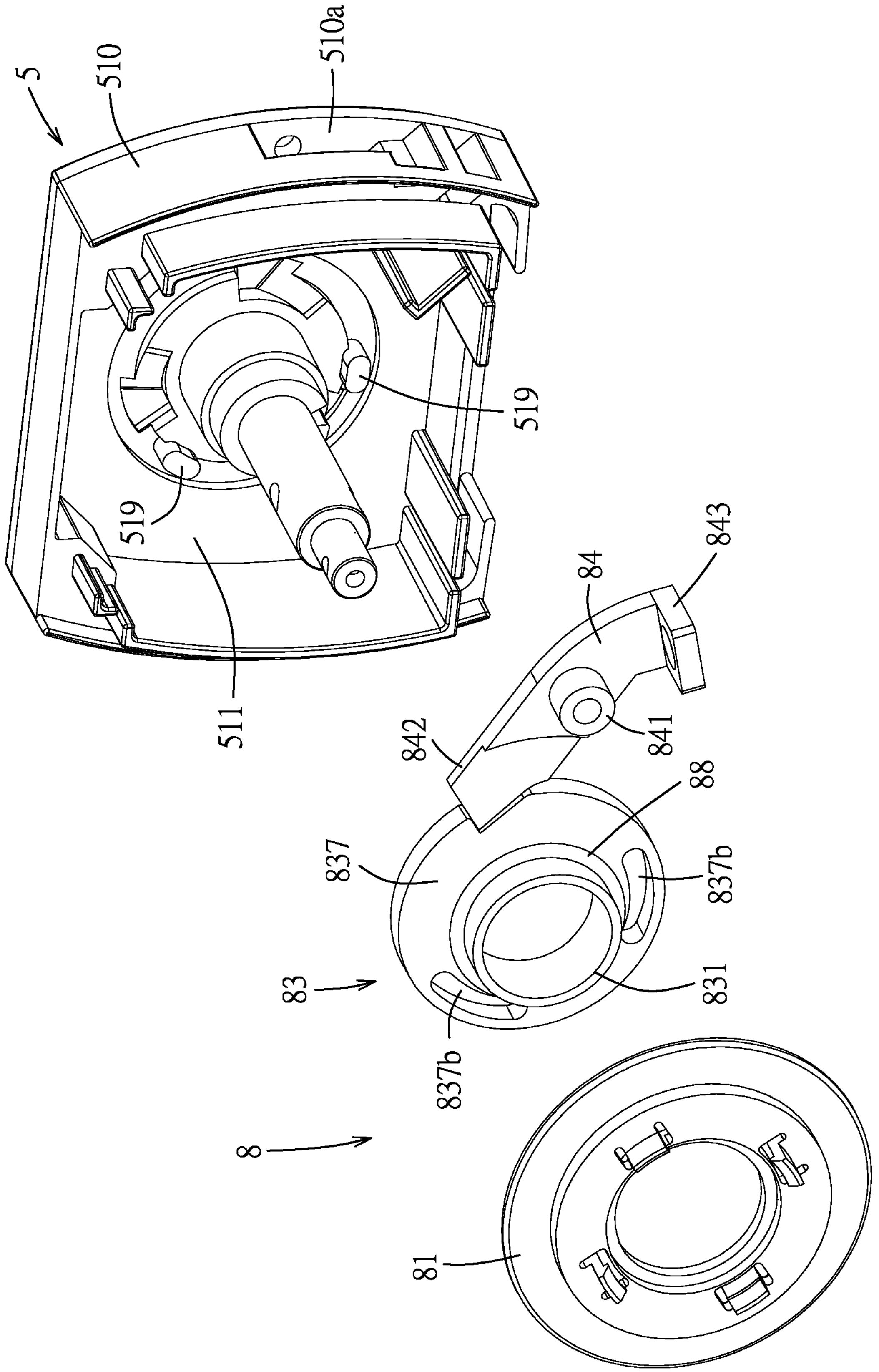
FIG. 41 is an exploded perspective view of FIG. 40.

With reference to FIGS. 39 to 41, in a fifth embodiment, the forced portion 831 of the thrust member 83 is in the form of a tube which extends axially from an inner periphery of the annular portion 837 and which is inserted into the driving reel 81. The driving unit 8 further includes a transmitting ring 88 which is sleeved on the forced portion 831 and frictionally interposed between the forced portion 831 and the driving reel 81 so as to transmit rotation of the driving reel 81 to rotate the forced portion 831. The transmitting ring 88 may be made from silicone, rubber and other elastomeric material. Further, the annular portion 837 has two elongated grooves (837*b*) extending along the inner periphery. The base seat 51 further has two studs 519 which are disposed on the mounting plate 511 and respectively and movably engaged in the elongated grooves (837*b*) so as to limit the rotation of the thrust member 83. Alternatively, only one elongated groove (837*b*) and one stud 519 may be disposed to be movably engaged with each other. In this embodiment, the hindering member 84 has a simple structure and is of an elongated bent shape. The base seat 51 further has a side wall 510 extending transverse to the mounting plate 511 and having a through slot (510*a*) for passing of the pull portion 843 of the hindering member 84 so as to limit the turning of the hindering member 84.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A blind lifting control module connectable with an end of a horizontal axle for controlling rotation of the axle, comprising:

a supporting unit including a base seat and a mounting shaft which is securely connected with said base seat and which extends parallel to the horizontal axle from said base seat, said mounting shaft having a shaft portion;

a transmitting wheel rotatably sleeved on said mounting shaft, and including an axle connecting body which is securely connectable with the end of the horizontal axle, and a flange disc which is connected with a side of said axle connecting body proximate to said base seat and which extends radially and outwardly from said axle connecting body, said axle connecting body having a receiving groove which extends from said side for receiving said shaft portion, and a first ratchet portion which is formed in said receiving groove and faces said base seat, said flange disc having a second ratchet portion which is formed on a surface that faces said base seat and surrounds said receiving groove;

an anti-backward unit including an anti-backward wheel and a biasing returning member which are received in said receiving groove, said anti-backward wheel having a movable wheel body which is movably sleeved on said shaft portion, and a third ratchet portion which is formed on a surface of said movable wheel body and faces said first ratchet portion, said anti-backward wheel being movable relative to said shaft portion between an anti-backward position, where said third ratchet portion meshes with said first ratchet portion to permit a uni-directional rotation of said transmitting wheel, and a released position, where said third ratchet portion is disengaged from said first ratchet portion, said biasing returning member being disposed to bias said anti-backward wheel to the anti-backward position; and a driving unit including a driving reel which is rotatably sleeved on said shaft portion, a transmitting member which is connected between said driving reel and said anti-backward wheel to transmit a rotation of said driving reel to move said anti-backward wheel to the released position, a thrust member which is movably disposed to said base seat, a hindering member which is pivotably disposed to said base seat, a pull cord which has an end secured to said driving reel and which winds on a periphery of said driving reel to have a free end for pulling operation, and a reel biasing member, said driving reel having a fourth ratchet portion which faces said second ratchet portion and being movable relative to said shaft portion between a driving position, where said fourth ratchet portion meshes with said second ratchet portion, and a normal position, where said fourth ratchet portion is disengaged from said second ratchet portion, said thrust member being movable relative to said base seat between an initial position, where said thrust member is free from action with said driving reel, and a thrusting position, where said thrust member provides a thrust force to move said driving reel to the driving position, said hindering member being turnable relative to said base seat between a hindering position, where said hindering member is kept to position said thrust member in the initial position, and a keeping-off position, where said thrust member is allowed for movement to the thrusting position, said free end of said pull cord passing through said hindering member to receive a pulling force to turn said hindering member, said reel biasing member being disposed to bias said driving reel to rotate to reel said pull cord.

2. The blind lifting control module as claimed in claim 1, wherein said mounting shaft further has a protrusion which projects radially and outwardly from said shaft portion to serve as a cam surface, said anti-backward wheel being rotatable relative to said shaft portion, and having a groove which is cut in said movable wheel body and engaged with said protrusion so as to convert a rotation of said anti-backward wheel into an axial movement between the anti-backward position and the released position.

3. The blind lifting control module as claimed in claim 2, wherein said transmitting member is in form of a string having two ends which are respectively secured to said movable wheel body and said driving reel, and a middle portion which winds on said shaft portion such that said transmitting member is tensed by a pulling force applied to said pull cord to the end through said driving reel to move said anti-backward wheel to the released position.

4. The blind lifting control module as claimed in claim 1, wherein said thrust member is pivotably disposed to said base seat, and has a forced portion through which said pull cord passes to be turned by a pulling action of said pull cord, and a thrust portion which is disposed at an opposite side of said driving reel relative to said fourth ratchet portion to thrust said driving reel such that said thrust member is activated by the pulling action of said pull cord to turn from the initial position to the thrusting position.

5. The blind lifting control module as claimed in claim 4, wherein said hindering member is in form of a lever which extends in an upright direction and which has a fulcrum portion that is pivotably connected to said base seat, a hindering portion that is disposed upwardly of said fulcrum portion to engage with said thrust portion of said thrust member for hindering turning of said forced portion, and a pull portion that is disposed downwardly of said fulcrum portion, said pull cord passing through said pull portion.

6. The blind lifting control module as claimed in claim 5, wherein said base seat has a mounting plate which extends in the upright direction transverse to said shaft portion of said mounting shaft, and a supporting portion which projects horizontally from said mounting plate and is disposed upwardly of said mounting shaft, said thrust member having a pivot axle which is pivotably journalled on said supporting portion and which extends transverse to said mounting shaft and the upright direction such that said forced portion is turnable about said pivot axle.

7. The blind lifting control module as claimed in claim 5, wherein said thrust portion of said thrust member has an engaging notch cut from an end edge thereof that is close to said hindering portion of said hindering member such that, an outwardly-inclined downward pulling force applied to said pull cord brings about turning of said hindering member to the hindering position, where said hindering portion is engaged in said engaging notch, and such that an uprightly downward pulling force applied to said pull cord brings about turning of said hindering member to the keeping-off position, where said hindering portion is remote from said thrust portion.

8. The blind lifting control module as claimed in claim 5, wherein said thrust portion of said thrust member has a keeping-off notch cut from a lower edge thereof that is close to said hindering portion of said hindering member such that, an uprightly downward pulling force applied to said pull cord brings about turning of said hindering member to the hindering position, where said hindering portion abuts against said lower edge, and such that an outwardly-inclined downward pulling force applied to said pull cord brings about turning of said hindering member to the keeping-off position, where said hindering portion is received in said keeping-off notch.

9. The blind lifting control module as claimed in claim 1, wherein said driving unit further includes an elastomeric biasing ring which is frictionally interposed between said transmitting wheel and said driving reel to bias said driving reel back to the normal position.

10. The blind lifting control module as claimed in claim 5, wherein said base seat has a mounting plate which extends in the upright direction transverse to said shaft portion of said mounting shaft, said mounting plate has a plurality of annular grooves which surround said shaft portion and are angularly spaced from each other, said thrust portion of said thrust member having an annular portion which is rotatable about and sleeved on said shaft portion, and a plurality of sliding protrusions which project from said annular portion and which are respectively and slidably engaged in said annular grooves so as to move said annular portion away from said mounting plate with rotation of said annular portion relative to said shaft portion to thrust said driving reel.

11. The blind lifting control module as claimed in claim 10, wherein said annular portion has an engaging notch cut from an outer periphery thereof that is close to said hindering portion of said hindering member so as to be engaged with said hindering portion when said hindering member is turned to the hindering position.

12. The blind lifting control module as claimed in claim 10, wherein said forced portion of said thrust member has an extension segment which extends radially and outwardly from an outer periphery of said annular portion, and a cord-pulling segment which extends from said extension segment and through which said pull cord passes.

13. The blind lifting control module as claimed in claim 12, wherein said forced portion further has a positioned segment which extends from said extension segment and transverse to said cord-pulling segment, said base seat further having a Positioning frame which is disposed on said mounting plate, and a stop block which is angularly spaced apart from said positioning frame and proximate to said hindering member, said positioned segment passing through and being positioned to said positioning frame when said thrust member is in the initial position, said extension segment abutting against and being stopped by said stop block when said thrust member is moved to the thrusting position.

14. The blind lifting control module as claimed in claim 10, wherein said forced portion of said thrust member is in form of a tube which extends axially from an inner periphery of said annular portion and which is inserted into said driving reel, said driving unit further including a transmitting ring which is sleeved on said forced portion and frictionally interposed between said forced portion and said driving reel so as to transmit rotation of said driving reel to rotate said forced portion.

15. The blind lifting control module as claimed in claim 14, wherein said annular portion has at least one elongated groove extending along said inner periphery, said base seat further having at least one stud which is disposed on said mounting plate and movably engaged in said elongated groove so as to limit the rotation of said thrust member.

16. The blind lifting control module as claimed in claim 1, wherein said axle connecting body of said transmitting wheel has an inner surrounding wall extending axially and defining said receiving groove therein, and a plurality of elastomeric muffling members formed on said inner surrounding wall.

17. A blind lifting device comprising:

a rail extending in an axial horizontal direction and having first and second ends opposite to each other;

a blind lifting control module as claimed in claim 1, wherein said base seat of said supporting unit is connected with said first end of said rail to have said shaft portion extending toward said second end;

a rotating support module connected with said second end of said rail; and a horizontal axle for reeling a blind thereon, said horizontal axle having two ends which are respectively connected with said blind lifting control module and said rotating support module so as to be controlled for its rotation by said blind lifting control module to lift and lower the blind.

18. The blind lifting device as claimed in claim 17, wherein said horizontal axle is in form of a tubular shaft and has a blind engaging portion which is concaved from an outer surrounding wall and which is elongated horizontally to said two ends to define an elongated slot for securely engaging with the blind, said axle connecting body of said transmitting wheel of said blind lifting control module being inserted into one of said ends of said horizontal axle, and having a first retaining slot which is retainingly connected with said blind engaging portion, said rotating support module including a mounting wall which extends in an upright direction to be connected with said rail, a support axle which is secured to said mounting wall and which extends horizontally toward said blind lifting control module, and a rotary seat which is rotatably sleeved on said support axle, said rotary seat having an axle connecting portion which is inserted into the other one of said ends of said horizontal axle and which has a second retaining slot that is retainingly connected with said blind engaging portion.

19. The blind lifting device as claimed in claim 18, wherein said rotary seat of said rotating support module further has a tubular portion which extends horizontally from said axle connecting portion toward said blind lifting control module to spacedly surround said support axle and which has a diameter smaller than that of said axle connecting portion, said support axle having an axle body and at least one frictional ring, said axle body having a secured end portion which is secured to said mounting wall, and a free end portion which is opposite to said secured end portion and exposed from said rotary seat, said frictional ring surrounding said free end portion, said rotating support module further including a speed-reducing sleeve and a coil member, said speed-reducing sleeve having a sleeve body which is sleeved on said free end portion, and a plurality of elastic plates which are arranged around said axle body and which extend from said sleeve body toward said rotary seat and have terminate ends interposed between said tubular portion and said axle body, said coil member being sleeved around said speed-reducing sleeve and having two ends which are respectively secured to said rotary seat and said sleeve body such that, during rotation of said horizontal axle to lower the blind, said speed-reducing sleeve is in frictional contact with said frictional ring to have a rotational speed slower than that of said rotary seat, and to shrink said coil member to compress said elastic plates toward said axle body so as to reduce the rotational speed of said rotary seat.

* * * * *